US010294316B2

(12) United States Patent
Luo et al.

(10) Patent No.: US 10,294,316 B2
(45) Date of Patent: May 21, 2019

(54) SILICA SUPPORTS WITH HIGH ALUMINOXANE LOADING CAPABILITY

(71) Applicant: ExxonMobil Chemical Patents Inc., Baytown, TX (US)

(72) Inventors: Lubin Luo, Houston, TX (US); Anupriya Jain, Pearland, TX (US); Xuan Ye, Houston, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 0 days.

(21) Appl. No.: 15/143,050

(22) Filed: Apr. 29, 2016

(65) Prior Publication Data

US 2016/0355619 A1 Dec. 8, 2016

Related U.S. Application Data

(60) Provisional application No. 62/206,004, filed on Aug. 17, 2015, provisional application No. 62/171,602, filed on Jun. 5, 2015.

(51) Int. Cl.
*C08F 4/02* (2006.01)
*C08F 4/6592* (2006.01)
*C08F 110/06* (2006.01)
*C08F 4/659* (2006.01)

(52) U.S. Cl.
CPC ............. *C08F 110/06* (2013.01); *C08F 4/02* (2013.01); *C08F 4/027* (2013.01); *C08F 4/65916* (2013.01); *C08F 4/65912* (2013.01); *C08F 4/65927* (2013.01)

(58) Field of Classification Search
CPC ..... C08F 4/02; C08F 4/65912; C08F 4/65916
See application file for complete search history.

(56) References Cited

U.S. PATENT DOCUMENTS

| | | |
|---|---|---|
| 5,049,535 A | 9/1991 | Resconi et al. |
| 5,276,208 A | 1/1994 | Winter et al. |
| 5,278,264 A | 1/1994 | Spaleck et al. |
| 5,411,994 A | 5/1995 | Galli et al. |
| 5,459,117 A | 10/1995 | Ewen |
| 5,532,396 A | 7/1996 | Winter et al. |
| 5,539,076 A | 7/1996 | Nowlin et al. |
| 5,543,373 A | 8/1996 | Winter et al. |
| 5,547,756 A | 8/1996 | Kamo et al. |
| 5,585,509 A | 12/1996 | Langhauser et al. |
| 5,589,549 A | 12/1996 | Govoni et al. |
| 5,631,202 A | 5/1997 | Ewen |
| 5,661,098 A | 8/1997 | Harrison et al. |
| 5,696,045 A | 12/1997 | Winter et al. |
| 5,700,886 A | 12/1997 | Winter et al. |
| 5,770,753 A | 6/1998 | Kueber et al. |
| 5,786,432 A | 7/1998 | Kueber et al. |
| 5,840,644 A | 11/1998 | Kueber et al. |
| 5,990,242 A | 11/1999 | Naga et al. |
| 5,869,584 A | 12/1999 | Winter et al. |
| 6,001,764 A | 12/1999 | Pullukat et al. |
| 6,028,140 A | 2/2000 | Collina et al. |
| 6,051,727 A | 4/2000 | Kuber et al. |
| 6,069,213 A | 5/2000 | Nemzek et al. |
| 6,121,182 A | 9/2000 | Okumura et al. |
| 6,150,481 A | 11/2000 | Winter et al. |
| 6,174,930 B1 | 1/2001 | Agarwal et al. |
| 6,242,544 B1 | 6/2001 | Kueber et al. |
| 6,255,506 B1 | 7/2001 | Kueber et al. |
| 6,262,195 B1 | 7/2001 | Dall'Occo et al. |
| 6,329,315 B1 | 12/2001 | Denton et al. |
| 6,350,830 B1 | 2/2002 | Gores et al. |
| 6,376,627 B1 | 4/2002 | Burkhardt et al. |
| 6,399,533 B2 | 6/2002 | Sacchetti et al. |
| 6,429,250 B1 | 8/2002 | Rohrmann et al. |
| 6,444,833 B1 | 9/2002 | Ewen et al. |
| 6,492,465 B1 | 12/2002 | Burkhardt et al. |
| 6,559,252 B1 | 5/2003 | Horton et al. |
| 6,608,224 B2 | 8/2003 | Resconi et al. |
| 6,635,779 B1 | 10/2003 | Ewen et al. |
| 6,841,501 B2 | 12/2003 | Resconi et al. |
| 6,673,736 B2 | 1/2004 | Kellum et al. |
| 6,878,786 B2 | 2/2004 | Resconi et al. |
| 6,777,366 B2 | 8/2004 | Gauthier et al. |
| 6,777,367 B2 | 8/2004 | Gauthier et al. |
| 6,787,616 B2* | 9/2004 | Takemori ............... C08F 10/02 502/120 |
| 6,846,943 B2 | 1/2005 | Nakano et al. |
| 6,855,783 B2* | 2/2005 | Gauthier ............... C08F 10/00 502/103 |
| 6,870,016 B1 | 3/2005 | Burkhardt et al. |
| 6,916,886 B2 | 7/2005 | Morioka et al. |
| 6,949,614 B1 | 9/2005 | Schottek et al. |

(Continued)

FOREIGN PATENT DOCUMENTS

| | | |
|---|---|---|
| CN | 102731691 | 2/2014 |
| EP | 0834519 | 4/1998 |

(Continued)

OTHER PUBLICATIONS

Mortazavi, M.M., et al. "*Characterization of MAO Modified Silicas for Ethylene Polymerization*," Journal of Applied Polymer Science, 2013, vol. 130, No. 6, pp. 4568-4575.

Zheng, X, et al. "*Fragmentation Behavior of Silica-Supported Metallocene/MAO Catalysts in the Early Stages of Olefin Polymerization*," Macromolecules, 2005, vol. 38, No. 11, pp. 4673-4678.

Cecchin, G. et al., "On the Mechanism of Polypropene Growth over MgCl2/TiCl4 Catalyst Systems," Macromolecular Chemistry and Physics, 2001, vol. 202, No. 10, p. 1987-1994.

Chen, J. et al., "Preparation and characterization of agglomerated porous hollow silica supports for olefin polymerization catalyst," Journal of Non-Crystalline Solids, 2007, vol. 353, No. 11-12, pp. 1030-1036.

(Continued)

*Primary Examiner* — Caixia Lu

(57) ABSTRACT

Olefin polymerization catalyst systems having high aluminoxane loading and methods for making and using them are disclosed herein.

35 Claims, 6 Drawing Sheets

(56) References Cited

U.S. PATENT DOCUMENTS

| | | |
|---|---|---|
| 6,953,829 B2 | 10/2005 | Kratzer et al. |
| 6,992,153 B1 | 1/2006 | Collina et al. |
| 7,034,173 B2 | 4/2006 | Schottek |
| 7,122,498 B2 | 10/2006 | Hart et al. |
| 7,141,527 B1 | 11/2006 | Van Baar et al. |
| 7,314,903 B2 | 1/2008 | Resconi et al. |
| 7,342,078 B2 | 3/2008 | Schottek et al. |
| 7,405,261 B2 | 7/2008 | Schulte et al. |
| 7,452,949 B2 | 11/2008 | Okumura et al. |
| 7,569,651 B2 | 8/2009 | Schottek et al. |
| 7,615,597 B2 | 11/2009 | Resconi et al. |
| 7,799,880 B2 | 9/2010 | Ciaccia |
| 7,829,495 B2 | 11/2010 | Floyd et al. |
| 7,964,679 B2 | 6/2011 | Resconi et al. |
| 7,985,799 B2 | 7/2011 | Resconi et al. |
| 8,222,356 B2 | 7/2012 | Kipke et al. |
| 8,299,287 B2 | 10/2012 | Dimeska et al. |
| 8,318,872 B2 | 11/2012 | Savatsky et al. |
| 8,399,375 B2 | 3/2013 | Itan et al. |
| 8,415,492 B2 | 4/2013 | Sell et al. |
| 8,507,706 B2 | 8/2013 | Dimeska et al. |
| 8,557,917 B2 | 10/2013 | Leskinen et al. |
| 8,729,206 B2 | 5/2014 | Resconi et al. |
| 9,193,856 B2 | 11/2015 | Ebata et al. |
| 9,249,239 B2 | 2/2016 | Jian et al. |
| 9,376,559 B2 | 6/2016 | Holtcamp et al. |
| 9,458,257 B2 | 10/2016 | Funaya et al. |
| 9,464,145 B2 | 10/2016 | Yang et al. |
| 9,644,047 B2 | 5/2017 | Yang et al. |
| 9,718,900 B2 | 8/2017 | Giesbrecht |
| 9,725,537 B2 | 8/2017 | Luo et al. |
| 9,725,569 B2 | 8/2017 | Holtcamp et al. |
| 9,738,779 B2 | 8/2017 | Luo et al. |
| 9,745,390 B2 | 8/2017 | Yang et al. |
| 9,809,664 B2 | 11/2017 | Luo et al. |
| 9,834,628 B2 | 12/2017 | Canich et al. |
| 9,920,176 B2 | 3/2018 | Luo et al. |
| 9,944,665 B2 | 4/2018 | Yang et al. |
| 10,077,325 B2 | 9/2018 | Luo et al. |
| 10,119,016 B2 | 11/2018 | Luo et al. |
| 2001/0053833 A1 | 12/2001 | Nakano et al. |
| 2002/0147105 A1 | 10/2002 | Shamshoum et al. |
| 2003/0171207 A1 | 9/2003 | Shih et al. |
| 2003/0236365 A1 | 12/2003 | Tian et al. |
| 2004/0204310 A1 | 10/2004 | Gauthier et al. |
| 2005/0003951 A1 | 1/2005 | Ferraro et al. |
| 2005/0085376 A1 | 4/2005 | Nagy et al. |
| 2005/0182266 A1 | 8/2005 | Schulte et al. |
| 2007/0004814 A1 | 1/2007 | Resconi et al. |
| 2007/0055021 A1 | 3/2007 | Chandrashekar et al. |
| 2007/0179051 A1 | 8/2007 | Mihan et al. |
| 2009/0018267 A1 | 1/2009 | Vestberg et al. |
| 2009/0062492 A1 | 3/2009 | Luo et al. |
| 2009/0259007 A1 | 10/2009 | Ciaccia |
| 2010/0267907 A1 | 10/2010 | Dimeska et al. |
| 2011/0034649 A1 | 2/2011 | Standaert et al. |
| 2011/0160373 A1 | 2/2011 | Bernreitner et al. |
| 2011/0081817 A1 | 4/2011 | Bieser et al. |
| 2011/0112262 A1 | 5/2011 | Gauthier et al. |
| 2011/0230630 A1 | 9/2011 | Sell et al. |
| 2013/0253124 A1 | 9/2013 | Bernreiter et al. |
| 2013/0345376 A1 | 12/2013 | Luo et al. |
| 2014/0221514 A1 | 8/2014 | Datta et al. |
| 2014/0303308 A1 | 10/2014 | Grestenberger et al. |
| 2014/0357771 A1 | 12/2014 | Tranninger et al. |
| 2015/0025208 A1 | 1/2015 | Yang et al. |
| 2015/0119537 A1 | 4/2015 | Holtcamp et al. |
| 2015/0183893 A1 | 7/2015 | Yang et al. |
| 2016/0032025 A1 | 2/2016 | Giesbrecht |
| 2016/0137763 A1 | 5/2016 | Holtcamp et al. |
| 2016/0244539 A1 | 8/2016 | Resconi et al. |
| 2016/0355618 A1 | 12/2016 | Luo et al. |
| 2016/0355653 A1 | 12/2016 | Holtcamp et al. |
| 2016/0355654 A1 | 12/2016 | Luo et al. |
| 2016/0355655 A1 | 12/2016 | Luo et al. |
| 2016/0355656 A1 | 12/2016 | Luo et al. |
| 2016/0355657 A1 | 12/2016 | Luo et al. |
| 2017/0342175 A1 | 11/2017 | Hagadorn et al. |
| 2018/0022843 A1 | 1/2018 | Luo et al. |
| 2018/0142045 A1 | 5/2018 | Luo |
| 2018/0142046 A1 | 5/2018 | Luo |
| 2018/0162964 A1 | 6/2018 | Yang et al. |
| 2018/0179309 A1 | 6/2018 | Luo et al. |

FOREIGN PATENT DOCUMENTS

| | | |
|---|---|---|
| EP | 1 205 493 | 5/2002 |
| EP | 1 380 598 | 1/2004 |
| EP | 1 541 598 | 6/2005 |
| JP | 2003-073414 | 3/2003 |
| JP | 2012-214709 | 11/2012 |
| WO | WO 1996/11218 | 4/1996 |
| WO | 01/58970 | 8/2001 |
| WO | 02/02575 | 1/2002 |
| WO | 02/02576 | 1/2002 |
| WO | 03/002583 | 1/2003 |
| WO | 03/045551 | 6/2003 |
| WO | 03/051934 | 6/2003 |
| WO | 2004/052945 | 6/2004 |
| WO | WO 2004/092225 | 10/2004 |
| WO | 2004/106351 | 12/2004 |
| WO | WO 2014/016318 | 1/2014 |
| WO | WO 2015/065676 | 5/2015 |
| WO | WO 2015/070360 | 5/2015 |
| WO | 2016/196331 | 12/2016 |
| WO | 2016/196334 | 12/2016 |
| WO | 2016/196339 | 12/2016 |
| WO | 2016/197014 | 12/2016 |
| WO | 2016/197037 | 12/2016 |
| WO | 2017/204830 | 11/2017 |

OTHER PUBLICATIONS

Imhoff, D.W. et al., "Characterization of Methylaluminoxanes and Determination of Trimethylaluminum Using Proton NMR" Organometallics, 1998, vol. 17, p. 1941-1945.

Kaminsky, W., "Highly Active Metallocene Catalysts for Olefin Polymerization" Journal of Chemical Society, Dalton Trans., 1998, p. 1413-1418.

Pasquini, N., (Ed.), Polypropylene Handbook, 2005, 2$^{nd}$ Ed., Hanser Publishers, Munich, pp. 78-89.

Shinamoto, Ron et al., "Microspherical Silica Supports with High Pore Volume for Metallocene Catalysts," presented at Metallocenes Europe '97 Dusseldorf, Germany, Apr. 8-9, 1997.

Sinn, H. "Proposals for Structure and Effect of Methylalumoxane Based on Mass Balances and Phase Separation Experiments" Macromolecular Symposia, 1995, vol. 97, Issue 1, pp. 27-52.

Smit, M. et al., "Effects of Methylaluminoxane Immobilization on Silica on the Performance of Zirconocene Catalysts in Propylene Polymerization," Journal of Polymer Science: Part A: Polymer Chemistry, 2005, vol. 43, pp. 2734-2748.

Von Hohenesche, C. et al., "Agglomerated non-porous silica nanoparticles as model carriers in polyethylene synthesis," Journal of Molecular Catalysis A: Chemical, Elsevier, Amsterdam, NL, 2004, vol. 221, No. 1-2, pp. 185-199.

D'Agnillo et al., "Controlling Molecular Weight Distributions of Polyethylene by Combining Soluble Metallocene/MAO Catalysts," Journal of Polymer Science Part A: Polymer Chemistry, 1998, vol. 36, No. 5, pp. 831-840.

Resconi et al., "Metallocene Catalysts for Propylene Polymerization," Polypropylene Handbook, Pasquini, Ed., Chapter 2.2, Hanser Publications, Munic, 2005.

Schmidt et al., "Synthesis and characterization of unbridged metallocene dichloride complexes with two differently mono-substituted indenyl ligands and their application as catalysts for the polymerization of ethane and propene," Journal of Molecular Catalysis A: Chemical, 2001, 172 (1-2), pp. 43-65.

Tynys et al,, "Ethylene-Propylene Copolymerizations: Effect of Metallocene Structure on Termination Reactions and Polymer Microstructure," Macromolecular Chemical Phys., 2005, vol. 206, pp. 1043-1056.

(56) References Cited

OTHER PUBLICATIONS

Severn et al., Editors, Tailor-Made Polymers, 2008, pg. 103.
U.S. Appl. No. 16/301,596 filed Nov. 14, 2018.

* cited by examiner

FIG. 1: Raw PD 14024 Silica
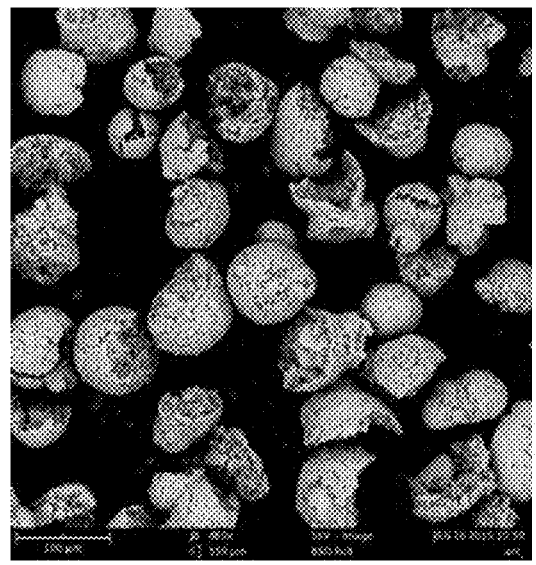
FIG. 2: sMAO PD 14024 Silica
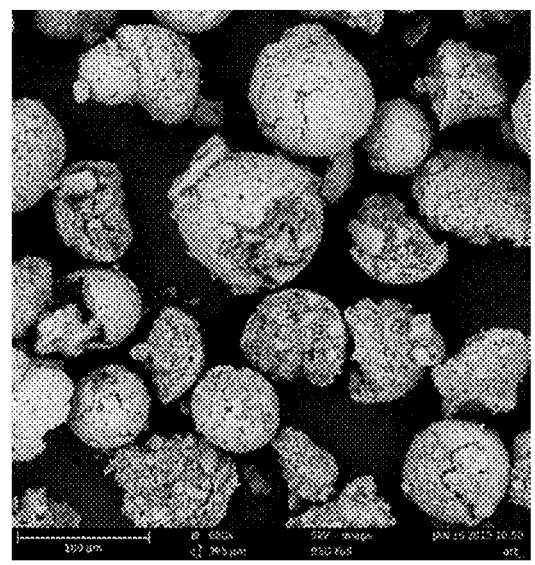

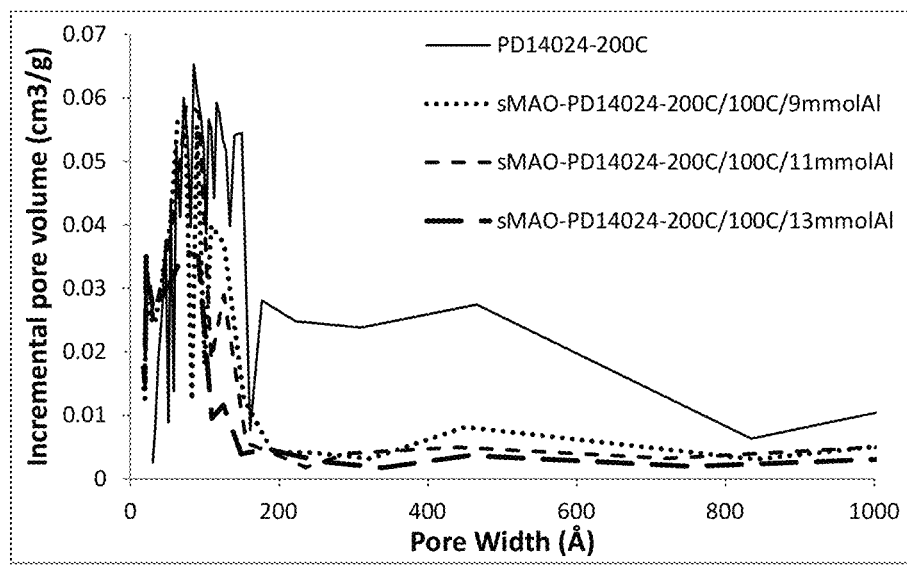
FIG. 3: Plot of Pore Diameter Distribution for PD 14024 Silica

FIG. 4: Raw Fuji P-3 Silica
FIG. 5: sMAO Fuji P-3 Silica
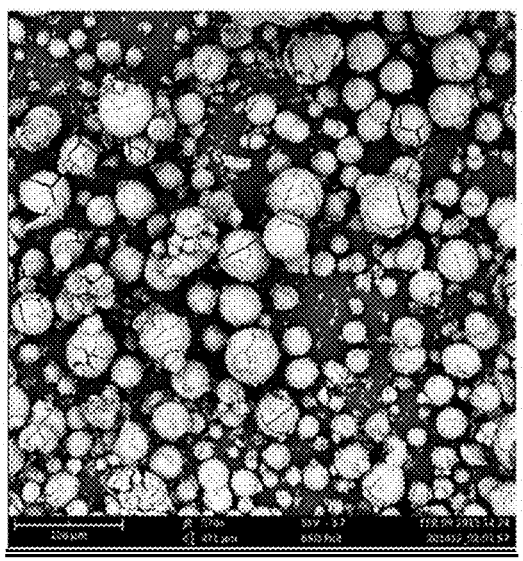

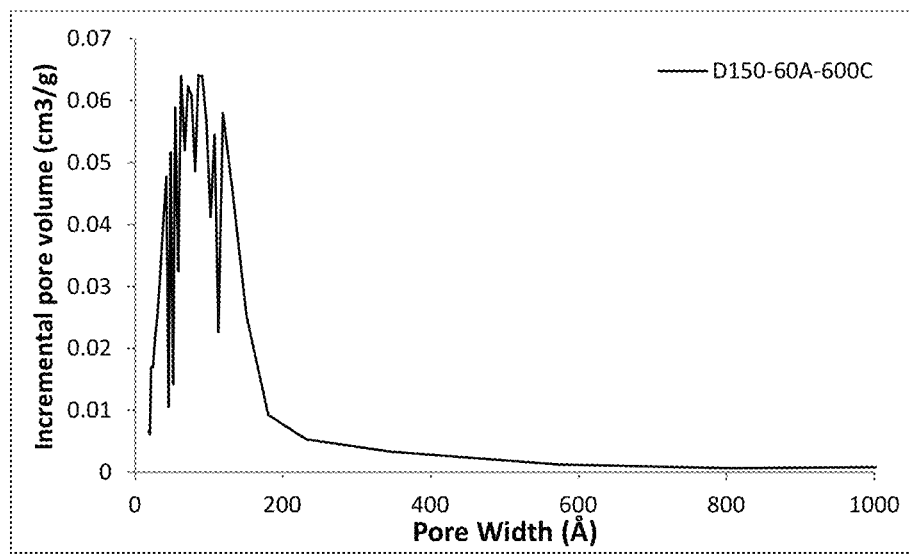
FIG. 6: Pore Diameter Distribution for Raw AGC D150-60A Silica

FIG. 7: sMAO AGC D150-60A Silica (High Temperature)
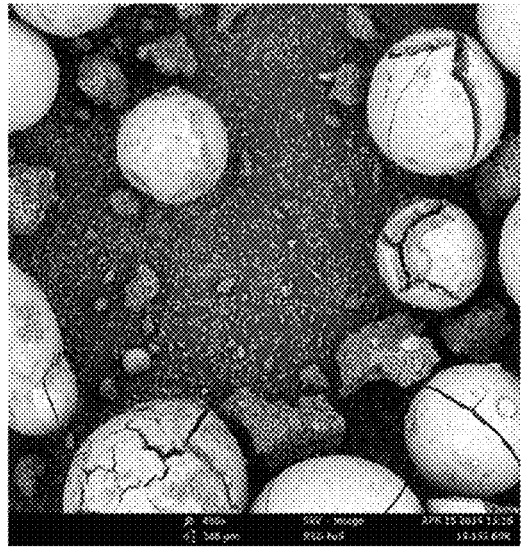
FIG. 8: sMAO AGC D150-60A Silica (Low Temperature)
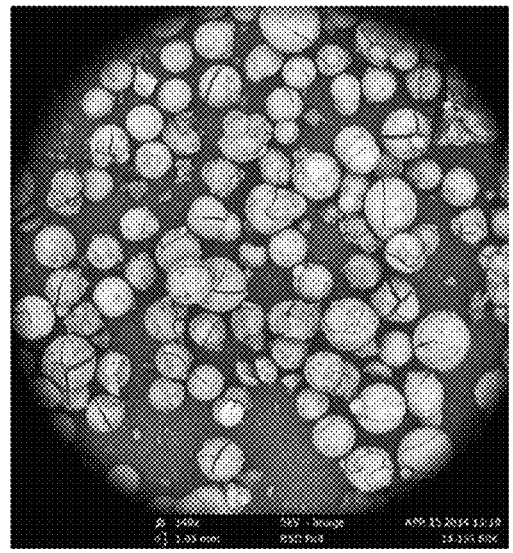

FIG. 9: Raw PQ MS 3065 Silica (After Scratch)
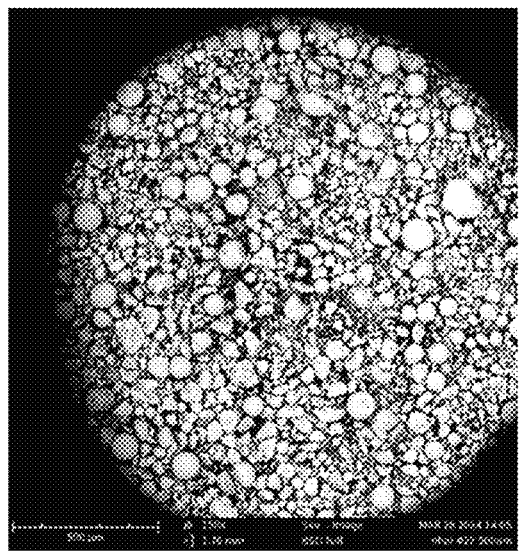
FIG. 10: sMAO PD 13054 Silica
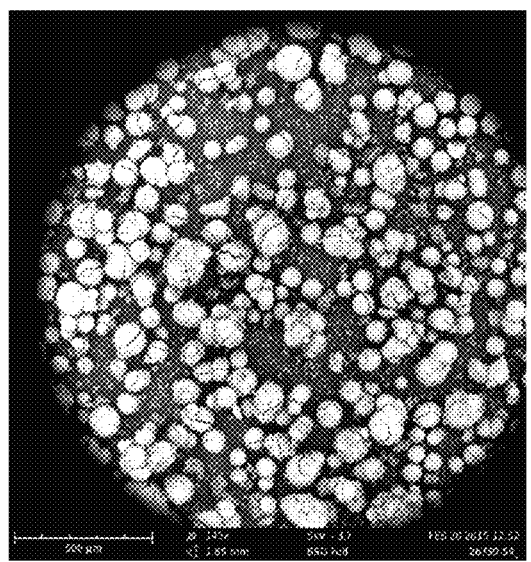

SILICA SUPPORTS WITH HIGH ALUMINOXANE LOADING CAPABILITY

CROSS REFERENCE TO RELATED APPLICATIONS

This invention claims priority to and the benefit of U.S. Ser. No. 62/171,602, filed Jun. 5, 2015 and U.S. Ser. No. 62/206,004, filed Aug. 17, 2015.

FIELD OF THE INVENTION

This invention relates to olefin polymerization catalyst systems comprising silica supports with high aluminoxane loading capability, methods for producing such catalysts systems, and methods for polymerizing olefins using such catalyst systems.

BACKGROUND OF THE INVENTION

The discovery of metallocene catalysts activated with aluminoxanes has enabled the synthesis of new polyolefins with improved properties. A significant disadvantage of metallocene catalysts, however, is the requirement of large amounts of often expensive co-catalyst (such as an aluminoxane) to activate the catalysts. Additionally, while homogeneous metallocene catalysts can be used in solution phase reactors, the metallocene catalyst compounds generally need to be supported to be used in most other polymerization processes. Thus, while many metallocene catalysts are capable of making polyolefins with commercially desirable properties, the catalysts are often not practical or economical on an industrial scale due to the large amount of co-catalyst needed and difficulties in incorporating the catalyst and co-catalyst on a support.

It is important to find a way to incorporate the metallocene and co-catalyst onto the support without losing the advantages of the homogenous metallocene compound, including high catalyst activity, stereochemical control, and the ability to tailor polymer properties. Identifying the optimum properties for metallocene catalyst supports is an area of significant research interest. Both the nature of the support and the method used to integrate the support and/or co-catalyst can affect the catalyst activity and the final properties of the polymer.

Although aluminoxanes are expensive, silica supported catalysts with higher aluminoxane loadings are desirable in some circumstances. For example, when the metallocene compound has low activity or low activation efficiency or when a multi-catalyst precursor system is used where the total catalyst precursor loadings are higher than usual, higher aluminoxane loading may be required to achieve a commercially viable catalyst activity. In polymerization processes where liquid solvent is present, such as slurry and condensed mode processes, MAO is soluble in the solvent and can leach out of the silica particles. It is not possible with conventional silicas, e.g., Grace 948 or 955, PQ ES 70 or ES 757, to load more than about 8 to 9 mmol Al/g of silica onto the support without leaching of MAO (and possibly catalyst) into the solvent medium. This leaching can cause fouling and fines in the reactor system and can negatively impact catalyst activity and polymer properties.

It is also important for a catalyst support to be able to retain mechanical strength under the operating conditions of the process in which it is used. Many polymerization processes take place at significantly higher than ambient temperatures and pressures. If the mechanical strength of the support is compromised, the impregnated silica particles can fragment. This can also lead to activator and catalyst leaching into the solvent medium. Additionally, polymerization can start to take place on the smaller fragmented particles, leading to agglomerates within the reactor system that can cause fouling, plugging, and other problems.

Pullukat, T. J., et al., "*Microspherical Silica Supports with High Pore Volume for Metallocene Catalysts*," presented at Metallocenes Europe '97, Dusseldorf, Germany, Apr. 8-9, 1997, pp. 1-11 discloses silica gel beads with a pore volume of 3.0 cc/g. It is said that the higher pore volumes of these silicas allow for greater versatility in preparing high surface area supports. Metallocene catalysts using these high pore volume silicas are disclosed with an MAO loading of 7 mmol Al/g silica.

U.S. Pat. No. 6,001,764 discloses a non-metallocene Ziegler-Natta based catalyst component on a silica support having high pore volume and high surface area. The catalytic component comprises a complex product of a transition metal halide and a metal alkyl which excludes cyclopentadienyl. The examples do not use an aluminoxane co-catalyst, and no mention is made of aluminoxane loading.

Thus, there is a need for catalyst systems, particularly metallocene catalyst systems, with supports having higher aluminoxane loading capabilities that are capable of maintaining the mechanical strength necessary for a variety of polymerization processes.

SUMMARY OF THE INVENTION

The invention is directed to an olefin polymerization catalyst system comprising a silica supported aluminoxane, wherein the silica supported aluminoxane comprises silica gel particles having an average surface area of from about 400 to 800 m$^2$/g, an average pore diameter of from about 60 to 80 Angstrom, and at least 20% of the incremental pore volume comprised of pores having a pore diameter smaller than about 70 Angstrom.

The invention is also directed to a method for making a silica supported aluminoxane comprising contacting a silica support and an aluminoxane; wherein when, during contacting the silica support and aluminoxane, the temperature does not exceed 40° C., the porous silica support obtains a first aluminoxane loading, and when the temperature is 40° C. or greater, the porous silica support obtains a second aluminoxane loading; and wherein the second aluminoxane loading is at least about 1.0 mmol Al/g silica or greater than the first aluminoxane loading.

The invention is also directed to a method for making a silica supported aluminoxane comprising contacting a silica support and an aluminoxane; wherein during contacting the silica support and the aluminoxane, the temperature is 40° C. or greater, and wherein the aluminoxane loading on the support is greater than about 9.5 mmol Al/g silica.

The invention is also directed to methods for polymerization of olefins using the catalyst systems and silica supported aluminoxanes disclosed herein. The catalyst system may be a single site catalyst system. The catalyst system may also be a metallocene catalyst system.

BRIEF DESCRIPTION OF THE DRAWINGS

FIG. 1 is an electron micrograph of raw PD 14024 silica.

FIG. 2 is an electron micrograph of MAO supported on PD 14024 silica, with an aluminoxane loading of 13.2 mmol Al/g silica.

FIG. 3 is a plot of the pore diameter distribution for raw PD 14024 silica versus MAO supported PD 14024 silica at different MAO loadings.

FIG. 4 is an electron micrograph of raw Fuji P-3 silica.

FIG. 5 is an electron micrograph of MAO supported on Fuji-P-3 silica, with an aluminoxane loading of 12.5 mmol Al/g silica.

FIG. 6 is a plot of the pore diameter distribution for raw AGC D150-60A silica.

FIG. 7 is an electron micrograph of MAO supported on AGC D150-60A silica prepared at high temperature, after heat treatment, and where MAO solid leaching has occurred.

FIG. 8 is an electron micrograph of MAO supported on AGC D150-60A silica prepared at low temperature.

FIG. 9 is an electron micrograph of raw PQ MS 3065 silica after a scratch with a lab spatula.

FIG. 10 is an electron micrograph of MAO supported on PD 13054 silica, with an aluminoxane loading of 11.4 mmol Al/g silica and where MAO solid leaching has occurred.

DEFINITIONS

For purposes of this disclosure and the claims appended thereto, the new numbering scheme for the Periodic Table Groups is used as described in CHEMICAL AND ENGINEERING NEWS, 63(5), p. 27, (1985).

For purposes herein, particle size (PS) or diameter, and distributions thereof, are determined by laser diffraction using a MASTERSIZER 3000 (range of 1 to 3500 μm) available from Malvern Instruments, Ltd., Worcestershire, England, or an LS 13 320 MW with a micro liquid module (range of 0.4 to 2000 μm) available from Beckman Coulter, Inc., Brea, Calif. Average PS refers to the distribution of particle volume with respect to particle size. Unless otherwise indicated expressly or by context, "particle" refers to the overall particle body or assembly such as an aggregate, agglomerate, or encapsulated agglomerate, rather than sub-units or parts of the body, such as the primary particles in agglomerates or the elementary particles in an aggregate.

For purposes herein, the surface area (SA, also called the specific surface area or BET surface area), pore volume (PV), and pore diameter (PD) of catalyst support materials are determined by the Brunauer-Emmett-Teller (BET) method using adsorption-desorption of nitrogen (temperature of liquid nitrogen: 77 K) with a MICROMERITICS TRISTAR II 3020 instrument or MICROMERITICS ASAP 2420 instrument after degassing of the powders for 4 to 8 hours at 100 to 300° C. for raw/calcined silica or 4 hours to overnight at 40 to 100° C. for silica supported aluminoxane. More information regarding the method can be found, for example, in "Characterization of Porous Solids and Powders: Surface Area, Pore Size and Density," S. Lowell et al., Springer, 2004. PV refers to the total PV, including both internal and external PV.

The following abbreviations may be used herein: Me is methyl, Et is ethyl, Pr is propyl, Bu is butyl, nBu is normal butyl, iBu is isobutyl, sBu is sec-butyl, tBu is tert-butyl, Oct is octyl, Ph is phenyl, Bn is benzyl, MAO is methylaluminoxane, MCN is metallocene, RT is room temperature (e.g., about 20-25° C.).

A "catalyst system" is a combination of at least one catalyst precursor compound, at least one activator, an optional co-activator, and a support material. A polymerization catalyst system is a catalyst system that can polymerize monomers to polymer.

The terms "hydrocarbyl radical," "hydrocarbyl," and "hydrocarbyl group" are used interchangeably throughout this document. Likewise, the terms "group," "radical," and "substituent" are also used interchangeably in this document. For purposes of this disclosure, "hydrocarbyl radical" is defined to be a radical, which contains hydrogen atoms and up to 100 carbon atoms and which may be linear, branched, or cyclic, and when cyclic, aromatic or non-aromatic.

A substituted hydrocarbyl radical is a hydrocarbyl radical where at least one hydrogen has been replaced by a heteroatom or heteroatom-containing group.

Halocarbyl radicals are radicals in which one or more hydrocarbyl hydrogen atoms have been substituted with at least one halogen (e.g., F, Cl, Br, I) or halogen-containing group (e.g., $CF_3$).

Silylcarbyl radicals (also called silylcarbyls) are groups in which the silyl functionality is bonded directly to the indicated atom or atoms. Examples include $SiH_3$, $SiH_2R^*$, $SiHR^*_2$, $SiR^*_3$, $SiH_2(OR^*)$, $SiH(OR^*)_2$, $Si(OR^*)_3$, $SiH_2(NR^*_2)$, $SiH(NR^*_2)_2$, $Si(NR^*_2)_3$, and the like, where $R^*$ is independently a hydrocarbyl or halocarbyl radical and two or more $R^*$ may join together to form a substituted or unsubstituted saturated, partially unsaturated or aromatic cyclic or polycyclic ring structure.

Germylcarbyl radicals (also called germylcarbyls) are groups in which the germyl functionality is bonded directly to the indicated atom or atoms. Examples include $GeH_3$, $GeH_2R^*$, $GeHR^*_2$, $GeR^*_3$, $GeH_2(OR^*)$, $GeH(OR^*)_2$, $Ge(OR^*)_3$, $GeH_2(NR^*_2)$, $GeH(NR^*_2)_2$, $Ge(NR^*_2)_3$, and the like, where $R^*$ is independently a hydrocarbyl or halocarbyl radical and two or more $R^*$ may join together to form a substituted or unsubstituted saturated, partially unsaturated or aromatic cyclic or polycyclic ring structure.

An aryl group is defined to be a single or multiple fused ring group where at least one ring is aromatic. Examples of aryl and substituted aryl groups include phenyl, naphthyl, anthracenyl, methylphenyl, isopropylphenyl, tert-butylphenyl, cyclopropyl, cyclobutyl, cyclopentyl, cyclohexyl, carbazolyl, indolyl, pyrrolyl, and cyclopenta[b]thiopheneyl. Preferred aryl groups include phenyl, benzyl, carbazolyl, naphthyl, and the like.

In using the terms "substituted cyclopentadienyl," or "substituted indenyl," or "substituted aryl," the substitution to the aforementioned is on a bondable ring position, and each occurrence is selected from hydrocarbyl, substituted hydrocarbyl, halocarbyl, substituted halocarbyl, silylcarbyl, germylcarbyl, a halogen radical, or a polar group. A "bondable ring position" is a ring position that is capable of bearing a substituent or bridging substituent. For example, cyclopenta[b]thienyl has five bondable ring positions (at the carbon atoms) and one non-bondable ring position (the sulfur atom); cyclopenta[b]pyrrolyl has six bondable ring positions (at the carbon atoms and at the nitrogen atom). Thus, in relation to aryl groups, the term "substituted" indicates that a hydrogen group has been replaced with a hydrocarbyl, substituted hydrocarbyl, halocarbyl, substituted halocarbyl, silylcarbyl, germylcarbyl, a halogen radical, or a polar group. For example, "methyl phenyl" is a phenyl group having had a hydrogen replaced by a methyl group.

DETAILED DESCRIPTION OF THE INVENTION

The present invention provides silica supported single site or metallocene catalyst-based olefin polymerization catalyst systems capable of high aluminoxane loadings, and methods for making and using such catalyst systems. It has been determined that a particular combination of surface area, pore diameter, and pore diameter distribution, among other factors, is optimum for increasing aluminoxane loading and maintaining mechanical strength in silica supports with single site and metallocene catalysts.

MAO, in commercially available embodiments, often has a molecule size of about 15-20 Angstroms. The pore diameters must be large enough to enable the aluminoxane to enter the pores for high MAO loadings. Smaller pore diameters can cause fragmentation of the supported MAO, especially during heat treatment. Also, if the pore diameters are too small, e.g., approaching 20 Angstroms or smaller, MAO molecules will not be able to enter the pores. Pore diameters that are too large, however, can result in highly hollow silica particles with very thin walls that do not have the mechanical strength to maintain their structure in a catalyst preparation or polymerization environment where factors such as high temperature, pressure, or agitation power are involved.

Additionally, the pore diameters in silica are not uniform, but rather are a distribution of different sizes. In a common process for preparing a silica-supported catalyst system, the silica is first contacted with an aluminoxane. The silica acts like a sponge, adsorbing the aluminoxane such that it coats the surfaces of the silica particles and pores. In preparation processes, the silica is often subject to a heat treatment after contact with the aluminoxane, which causes the aluminoxane to expand. The supported aluminoxane is then contacted with one or more catalyst precursors, which react with the supported aluminoxane to become an active catalyst. The active catalyst is contacted with one or more monomers in a polymerization system to form polymers. The pore diameters should be of sufficient size to allow aluminoxane to enter, coat the pores, and expand during heat treatment, while leaving enough space for catalyst precursors and monomers to react with the supported aluminoxane without significant mass transfer limitations. It has been determined that a certain pore diameter distribution, in combination with the other properties disclosed herein, is conducive to enabling this. In embodiments of the invention, at least 20%, 25%, 30%, 35%, 40%, 45%, 50%, 60%, 70%, 80%, 85%, or even more of the incremental pore volume, may be comprised of pores having a pore diameter larger than about 100, 125, or 150 Angstrom, and, optionally, smaller than about 1000, 900, 800 Angstrom, including any combination of numbers disclosed herein. Additionally, in embodiments of the invention, less than 20%, 15%, 10%, 5%, 2.5% or less of the incremental pore volume is comprised of pores having a pore diameter in the range of about 1000 Angstrom or more, about 900 Angstrom or more, or about 800 Angstrom or more.

The porous silica support may comprise silica gel particles having an average surface area of from about 400 to 800 $m^2/g$ and an average pore diameter of from about 60 to 200 Angstrom. The average surface area may range from a low of about 400, 500, 530, 540, 550, or 600 $m^2/g$ to a high of about 600, 650, 700, 750, or 800 $m^2/g$, including any combination of any upper or lower value disclosed herein. The average pore diameter may range from a low of about 60, 70, 80, 90, 100, or 110 Angstrom to a high of about 120, 130, 150, 180, or 200 Angstrom, including any combination of any upper or lower value disclosed herein.

The porous support may comprise silica gel particles having an average pore volume of from about 0.5 to 2.5 ml/g of silica. The average pore volume may range from a low of about 0.5, 0.7, 1.0, 1.1, 1.3, or 1.4 ml/g of silica to a high of about 1.5, 1.6, 1.8, 2.0, or 2.5, including any combination of any upper or lower value disclosed herein. The average pore volume may be about 0.5 ml/g, about 1.0 ml/g, about 1.5 ml/g, or about any value disclosed herein. In embodiments of the invention, a higher pore volume requires a lower surface area, or vice-versa.

The porous support may comprise silica gel particles having an average particle size of from about 20 to 200 micrometers. The average particle size may range from a low of about 20, 30, 50, 70, or 80 to a high of about 80, 90, 100, 110, 130, or 200 micrometers, including any combination of any upper or lower value disclosed herein.

The porous support may comprise agglomerates of a plurality of primary particles, the support or agglomerates preferably having an average particle size of at least 50 μm, or surface area less than 1000 $m^2/g$, or a combination thereof. The agglomerates may be at least partially encapsulated. In an embodiment of the invention, the porous support does not comprise agglomerates.

The term "agglomerate" as used herein refers to a material comprising an assembly, of primary particles held together by adhesion, i.e., characterized by weak physical interactions such that the particles can easily be separated by mechanical forces, e.g., particles joined together mainly at corners or edges. The term "primary particles" refers to the smallest, individual disagglomerable units of particles in an agglomerate (without fracturing), and may in turn be an encapsulated agglomerate, an aggregate or a monolithic particle. Agglomerates are typically characterized by having an SA not appreciably different from that of the primary particles of which it is composed. Silica agglomerates are prepared commercially, for example, by a spray drying process.

"Aggregates" are an assembly of elementary particles sharing a common crystalline structure, e.g., by a sintering or other physico-chemical process such as when the particles grow together. Aggregates are generally mechanically unbreakable, and the specific surface area of the aggregate is substantially less than that of the corresponding elementary particles. An "elementary particle" refers to the individual particles or grains in or from which an aggregate has been assembled. For example, the primary particles in an agglomerate may be elementary particles or aggregates of elementary particles. For more information on agglomerates and aggregates, see Walter, D., Primary Particles—Agglomerates—Aggregates, in Nanomaterials (ed Deutsche Forschungsgemeinschaft), Wiley-VCH Verlag GmbH & Co. KGaA, Weinheim, Germany, doi: 10.1002/9783527673919, pp. 1-24 (2013).

The terms "monolith" or "monolithic" refer to a material formed of a single mass of material, and include aggregates, as well as bulk materials, without any defined geometry or grain structure. FIG. 3 shows a comparative support MS 3050, comprised of generally spherical particles 20 with an entirely aggregated or monolithic core 22, lacking the agglomerated primary particles and internal pore morphology of the FIG. 1-2 supports.

The terms "capsule" or "encapsulated" or "microencapsulated" are used interchangeably herein to refer to an agglomerate in the 1-1000 μm size range comprising an exterior surface that is coated or otherwise has a physical barrier that inhibits disagglomeration of the primary particles from the interior of microencapsulated agglomerate. The barrier or coating may be an aggregate, for example, of primary and/or elementary particles otherwise constituted of the same material as the agglomerate. FIGS. 1-2 show examples of microencapsulated agglomerates 10 comprised of a plurality of primary particles 12 within an outer aggregate surface or shell 14 that partially or wholly encapsulates the agglomerates, in which the primary particles may be allowed to disagglomerate by fracturing, breaking, dissolving, chemically degrading or otherwise removing all or a portion of the shell 14.

In the case of spray dried, amorphous, hydrated-surface silica as one example, the agglomerates 10 may typically have an overall size range of 1-300 µm (e.g., 30-200 µm), the primary particles 12 a size range of 0.001-50 µm (e.g., 50-400 nm or 1-50 µm), and the elementary particles a size range of 1-400 nm (e.g., 5-40 nm). As used herein, "spray dried" refers to metal oxide such as silica obtained by expanding a sol in such a manner as to evaporate the liquid from the sol, e.g., by passing the silica sol through a jet or nozzle with a hot gas.

The porous support may comprise silica gel particles having any combination of properties disclosed herein. For example, the porous support may comprise silica gel particles having an average surface area of about 600 $m^2/g$ and an average pore diameter of about 90 Angstrom, or an average surface area of about 550 $m^2/g$ and an average pore diameter of about 110 Angstrom.

The combination of properties disclosed herein enables silica supports with high aluminoxane loadings. For example, the aluminoxane loading on the porous silica support may be greater than about 9.5, 10, 12, 14, or 18 mmol Al/silica. The aluminoxane loading may range from a low of about 9.5, 10, 11, 12, 13, 14, 15, or 16 mmol Al/g silica to a high of about 12, 14, 16, 18, or 20 mmol Al/g silica, including any combination of any upper or lower value disclosed herein.

For purposes herein, the term "aluminoxane loading" is the amount of aluminoxane in the silica supported aluminoxane that is adhered to silica particles. The aluminoxane may be adhered within the outer or inner pores of the particles, adhered to the surface of the particles, or otherwise adhered to the particles. Aluminoxane loading may be represented as mmol Al/g silica.

Certain processes for preparing a silica supported aluminoxane, such as the high temperature process designated as sMAO Method A in the Experimental section (or similar high temperature processes), can cause particle fragmentation and/or aluminoxane leaching with certain silicas. This is more likely to occur in silicas with smaller average pore diameters, such as with silicas having average pore diameters ranging from about 60 to about 80 Angstrom. In embodiments of the invention, these fragmented silica supported aluminoxanes have very high aluminoxane loadings. Without wishing to be bound by theory, it is believed that there are two possible mechanisms contributing to these high aluminoxane loadings. First, the particle fragmentation caused by heating may open up additional silica pores for aluminoxane entry and thus lead to higher aluminoxane loadings. Second, the larger amount of small pores, similar in size to the MAO molecules, present in silicas having smaller average pore diameters limits the expansion of solid MAO into the pores. This limitation may force aluminoxane out of the pores, leading to the formation of new aluminoxane-rich solid particles. In sum, whatever the mechanism is, the increased aluminoxane loading in these fragmented silica supported aluminoxanes may contribute to very high catalyst activities in certain applications.

Although these fragmented silica supported aluminoxanes may not be suitable for some catalyst preparation or polymerization systems, they may be suitable and even potentially quite valuable for others due to their ability to contribute to high catalyst activities. For example, they may be suitable in catalyst preparation environments where high agitation power is not involved or in polymerization reactor systems where catalyst particle size does not play a significant role or where aluminoxane leaching is not as likely to be problematic (e.g., gas phase polymerization reactor systems).

Where particle fragmentation and/or aluminoxane leaching are problematic with a given silica and it is desired to control these aspects, a different process for preparing the silica supported aluminoxane may be used. For example, the process designated as sMAO Method B in the Experimental section or a similar process where the reaction temperature for contacting the silica and aluminoxane is controlled at a lower temperature may be used. This may reduce the fragmentation and leaching, but may also reduce the aluminoxane loading.

Thus, in embodiments of the invention, when the reaction temperature for contacting the silica and aluminoxane is below about 40° C., the silica supported aluminoxane has a first aluminoxane loading, and when the reaction temperature is 40° C. or greater, the silica supported aluminoxane has a second aluminoxane loading. The second aluminoxane loading may be greater than the first aluminoxane loading by at least about 1.0, 2.0, 3.0, 4.0, 5.0, or 6.0 mmol Al/g silica. For example, the second aluminoxane loading may be greater than the first aluminoxane loading by in a range of from a low of about 1.0, 1.5, 2.0, 3.0, 4.0, or 5.0 mmol Al/g silica to a high of about 2.0, 3.0, 4.0, 5.0, or 6.0 mmol Al/g silica, including any combination of any upper or lower value disclosed herein.

The reactor temperature for contacting the silica and aluminoxane may be controlled in various ways. The reactor may be pre-chilled, for example, at or to a temperature less than RT, 15° C., 10° C., 0° C., −10° C., −15° C., or −20° C. The aluminoxane may also be pre-chilled so that it is at a temperature of less than or equal to about 10° C., 0° C., −10° C., −15° C., or −20° C. at the time of the initial contacting of the silica and aluminoxane.

The aluminoxane loading on the porous silica support may also be represented or evaluated by measuring the difference between the average surface area of the particles in the raw silica (referred to herein as "raw silica surface area") and the average surface area of the particles after aluminoxane has been incorporated (referred to herein as "supported aluminoxane surface area"). It is preferred that these two surface areas be similar. Hence, in embodiments of the invention, the difference between the raw silica surface area and the supported aluminoxane surface area may be about or less than 50%, 40%, 30%, 20%, or 10% on a volumetric basis. Both surface areas may be measured using the BET method described above.

The aluminoxane loading on the porous silica support may also be represented or evaluated by the difference in average particle size between the raw silica (referred to herein as "raw silica particle size") and the average particle size of the supported aluminoxane (referred to herein as "supported aluminoxane particle size"). It is preferred that these two particle sizes be similar. Hence, in embodiments of the invention, the difference between the raw silica particle size and the supported aluminoxane particle size may be about or less than 50%, 40%, 30%, 20%, or 10% on a volumetric basis. Both particle sizes may be measured by the laser refraction method described above.

Preferred embodiments of the catalyst system, support, activator, catalyst precursor compound, and co-activator are described in more detail below.

Support Materials:

The catalyst systems comprise porous solid particles as a support material to which the catalyst precursor compound and/or activator may be anchored, bound, adsorbed or the like. The support material comprises an inorganic oxide in a finely divided form. Suitable inorganic oxide materials for use in MCN catalyst systems herein include Groups 2, 4, 13, and 14 metal oxides, such as silica, alumina, magnesia, titania, zirconia, and the like, and mixtures thereof. Also, combinations of these support materials may be used, for example, silica-chromium, silica-alumina, silica-titania, and the like.

The support material comprises silica, e.g., amorphous silica, which may include a hydrated surface presenting hydroxyl or other groups, which can be deprotonated to form reactive sites to anchor activators and/or catalyst precursors. Other porous support materials may, optionally, be present with the silica as a co-support, for example, talc, other inorganic oxides, zeolites, clays, organoclays, or any other organic or inorganic support material and the like, or mixtures thereof. Silicas which may be suitable are commercially available under the trade designations PD 14024, D70-120A, and the like.

When a silica support is referred to herein, the silica support in raw form comprises at least 60 wt %, 70 wt %, 80 wt %, 90 wt %, 95 wt %, 98 wt %, or 99 wt % or more of silica. The silica support may comprise up to 5 wt %, 10 wt %, 20 wt %, 30 wt %, or 40 wt % of another compound. The other compound may be any other support material discussed herein. The other compound may be a titanium, aluminum, boron, magnesium, or mixtures thereof. Additionally, the other compound may be a talc, other inorganic oxide, zeolite, clay, organoclay, or mixtures thereof. The silica support may also not include any substantial amount of any other compound, i.e., the silica support comprises less than 5 wt %, 1 wt %, 0.5 wt %, 0.2 wt %, or less of any other compound.

According to some embodiments of the invention, the support material is then contacted with the activator (described in more detail below), at least one single site catalyst precursor compound (described in more detail below), and/or co-catalyst (described in more detail below), and, optionally, a scavenger or co-activator (described in more detail below).

Drying of the support material can be effected according to some embodiments of the invention by heating or calcining above about 100° C., e.g., from about 100° C. to about 1000° C., preferably at least about 200° C. The silica support may be heated to at least 130° C., about 130° C. to about 850° C., or about 200° C. to about 600° C. for a time of 1 minute to about 100 hours, e.g., from about 12 hours to about 72 hours, or from about 24 hours to about 60 hours. The calcined support material may comprise at least some groups reactive with an organometallic compound, e.g., reactive hydroxyl (OH) groups to produce the supported catalyst systems of this invention.

Supportation:

The support may be treated with an organometallic compound to react with deprotonated reactive sites on the support surface. In general, the support is treated first with an organometallic activator such as MAO, and then the supported activator is treated with the metallocene compound, optional metal alkyl co-activator, although the metallocene compound and or co-activator can be loaded first, followed by contact with the other catalyst system components.

The support material, having reactive surface groups especially after calcining, may be slurried in a non-polar solvent and contacted with the organometallic compound (activator in this example), preferably dissolved in the solvent, preferably for a period of time in the range of from about 0.5 hour to about 24 hours, from about 2 hours to about 16 hours, or from about 4 hours to about 8 hours. Suitable non-polar solvents are materials in which, other than the support material and its adducts, all of the reactants used herein, i.e., the activator, and the metallocene compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

The mixture of the support material and activator (or other organometallic compound) in various embodiments of the invention may generally be heated or maintained at a temperature of from about −60° C. up to about 130 or 140° C., such as, for example: about 40° C. or below, about RT or below, about −20° C. or below; from about 10° C. or 20° C. up to about 60° C. or about 40° C.; RT or about 25° C. or above; or from about 40° C., about 60° C., or about 80° C. up to about 100° C., or about 120° C. Where the support may be susceptible to fragmentation during activator/catalyst precursor supportation (e.g., SA≥650 m$^2$/g, PD ≤7 nm), fragmentation may be controlled through the manipulation of reaction conditions to inhibit fragmentation, such as, at a lower reaction temperature, e.g., −60° C.-40° C., preferably −20° C.-30° C., to achieve <10 vol % fragmented particles, preferably <5 vol % fragmented particles; or to promote fragmentation such as at a higher reaction temperature, e.g., ≥40° C., preferably ≥60° C., to achieve >10 vol % fragmented particles, e.g., 10-80 vol % fragmented particles, such as 10-20 vol % fragmented particles, 20-70 vol % fragmented particles, 70-90 vol % fragmented particles, >90 vol % fragmented particles, or the like. In general, the time and temperature required to promote fragmentation are inversely related, i.e., at a higher temperature, debris dominated fragmentation may require a shorter period of time.

The supported activator may, optionally, be treated with another organometallic compound which is also selected as the scavenger, preferably a metal alkyl such as an aluminum alkyl, to scavenge any hydroxyl or other reactive species that may be exposed by or otherwise remaining after treatment with the first organometallic compound, e.g., hydroxyl groups on surfaces exposed by fragmentation may be reacted and thereby removed by contact of the fragments with an aluminum alkyl such as triisobutylaluminum (TIBA). Useful metal alkyls which may be used according to some embodiments of the invention to treat the support material have the general formula $R_n$-M, wherein R is $C_1$-$C_{40}$ hydrocarbyl such as $C_1$-$C_{12}$ alkyl, for example, M is a metal, and n is equal to the valence of M, and may include oxophilic species such as diethyl zinc and aluminum alkyls, such as, for example, trimethylaluminum, triethylaluminum, triisobutylaluminum, tri-n-hexylaluminum, tri-n-octylaluminum and the like, including combinations thereof. Then the activator/support material is contacted with a solution of the catalyst precursor compound. In some embodiments of the invention, the supported activator is generated in situ. In alternate embodiments of the invention, the slurry of the support material is first contacted with the catalyst precursor compound for a period of time in the range of from about 0.5 hour to about 24 hours, from about 2 hours to about 16 hours, or from about 4 hours to about 8 hours, and the slurry of the supported MCN compound is then contacted with an organometallic-activator solution and/or organometallic-scavenger solution.

Activators:

Activators are compounds used to activate any one of the catalyst precursor compounds described above by converting the neutral catalyst precursor compound to a catalytically active catalyst compound cation. Preferred activators include aluminoxane compounds, including modified aluminoxane compounds.

Aluminoxanes are generally oligomeric, partially hydrolyzed aluminum alkyl compounds containing —Al(R1)-O— subunits, where R1 is an alkyl group, and may be produced by the hydrolysis of the respective trialkylaluminum compound. Examples of aluminoxane activators include methylaluminoxane (MAO), ethylaluminoxane, butylaluminoxane, isobutylaluminoxane, modified MAO (MMAO), halogenated MAO where the MAO may be halogenated before or after MAO supportation, dialkylaluminum cation enhanced MAO, surface bulky group modified MAO, and the like. MMAO may be produced by the hydrolysis of trimethylaluminum and a higher trialkylaluminum such as triisobutylaluminum. Mixtures of different aluminoxanes may also be used as the activator(s).

There are a variety of methods for preparing aluminoxanes suitable for use in the present invention, non-limiting examples of which are described in U.S. Pat. No. 4,665,208; U.S. Pat. No. 4,952,540; U.S. Pat. No. 5,041,584; U.S. Pat. No. 5,091,352; U.S. Pat. No. 5,206,199; U.S. Pat. No. 5,204,419; U.S. Pat. No. 4,874,734; U.S. Pat. No. 4,924,018; U.S. Pat. No. 4,908,463; U.S. Pat. No. 4,968,827; U.S. Pat. No. 5,308,815; U.S. Pat. No. 5,329,032; U.S. Pat. No. 5,248,801; U.S. Pat. No. 5,235,081; U.S. Pat. No. 5,157,137; U.S. Pat. No. 5,103,031; U.S. Pat. No. 5,391,793; U.S. Pat. No. 5,391,529; U.S. Pat. No. 5,693,838; U.S. Pat. No. 5,731,253; U.S. Pat. No. 5,731,451; U.S. Pat. No. 5,744,656; U.S. Pat. No. 5,847,177; U.S. Pat. No. 5,854,166; U.S. Pat. No. 5,856,256; U.S. Pat. No. 5,939,346; EP 0 561 476; EP 0 279 586; EP 0 594-218; EP 0 586 665; WO 94/10180; and WO 99/15534; halogenated MAO are described in U.S. Pat. No. 7,960,488; U.S. Pat. No. 7,355,058; and U.S. Pat. No. 8,354,485; dialkylaluminum cation enhanced MAO are described in US 2013/0345376; and surface bulky group modified supported MAO are described in U.S. Pat. No. 8,895,465, all of which are herein fully incorporated by reference.

Optional Scavengers or Co-Activators:

In addition to the activator compounds, scavengers or co-activators may be used. Suitable co-activators may be selected from the group consisting of: trialkylaluminum, dialkylmagnesium, alkylmagnesium halide, and dialkylzinc. Aluminum alkyl or organoaluminum compounds, which may be utilized as scavengers or co-activators, include, for example, trimethylaluminum, triethylaluminum, triisobutylaluminum, tri-n-hexylaluminum, tri-n-octylaluminum, and the like. Other oxophilic species, such as diethyl zinc may be used. As mentioned above, the organometallic compound used to treat the calcined support material may be a scavenger or co-activator, or may be the same as or different from the scavenger or co-activator. In an embodiment, the co-activator is selected from the group consisting of: trimethylaluminum, triethylaluminum, triisobutylaluminum, tri-n-octylaluminum, trihexylaluminum, and diethylzinc (alternately the group consisting of: trimethylaluminum, triethylaluminum, triisobutylaluminum, trihexylaluminum, tri-n-octylaluminum, dimethylmagnesium, diethylmagnesium, dipropylmagnesium, diisopropylmagnesium, dibutyl magnesium, diisobutylmagnesium, dihexylmagnesium, dioctylmagnesium, methylmagnesium chloride, ethylmagnesium chloride, propylmagnesium chloride, isopropylmagnesium chloride, butyl magnesium chloride, isobutylmagnesium chloride, hexylmagnesium chloride, octylmagnesium chloride, methylmagnesium fluoride, ethylmagnesium fluoride, propylmagnesium fluoride, isopropylmagnesium fluoride, butyl magnesium fluoride, isobutylmagnesium fluoride, hexylmagnesium fluoride, octylmagnesium fluoride, dimethylzinc, diethylzinc, dipropylzinc, and dibutylzinc).

Metallocene Catalyst Precursor Compounds: According to some embodiments of the invention, the single site catalyst precursor compound is represented by the following formula: $(Cp)_m R^4{}_n M^4 Q_k$; wherein each Cp is a cyclopentadienyl or a cyclopentadienyl substituted by one or more hydrocarbyl radicals having from 1 to 20 carbon atoms; $R^4$ is a structural bridge between two Cp rings; $M^4$ is a transition metal selected from groups 4 or 5; Q is a hydride or a hydrocarbyl group having from 1 to 20 carbon atoms or an alkenyl group having from 2 to 20 carbon atoms, or a halogen; m is 1, 2, or 3, with the proviso that if m is 2 or 3, each Cp may be the same or different; n is 0 or 1, with the proviso that n=0 if m=1; and k is such that k+m is equal to the oxidation state of $M^4$, with the proviso that if k is greater than 1, each Q may be the same or different.

According to some embodiments of the invention, the single site catalyst precursor compound is represented by the formula: $R^4(CpR''_p)(CpR^*_q)M^5 Q_r$; wherein each Cp is a cyclopentadienyl or substituted cyclopentadienyl ring; each $R^*$ and $R''$ is a hydrocarbyl group having from 1 to 20 carbon atoms and may be the same or different; p is 0, 1, 2, 3, or 4; q is 1, 2, 3, or 4; $R^4$ is a structural bridge between the Cp rings imparting stereorigidity to the metallocene compound; $M^5$ is a group 4, 5, or 6 metal; Q is a hydrocarbyl radical having from 1 to 20 carbon atoms or is a halogen; r is s minus 2, where s is the valence of $M^5$; wherein $(CpR^*_q)$ has bilateral or pseudobilateral symmetry; $R^*_q$ is selected, alkyl substituted indenyl, or tetra-, tri-, or dialkyl substituted cyclopentadienyl radical; and $(CpR''_p)$ contains a bulky group in one and only one of the distal positions; wherein the bulky group is of the formula $AR^w_v$; and where A is chosen from group 4 metals, oxygen, or nitrogen, and $R^w$ is a methyl radical or phenyl radical, and v is the valence of A minus 1.

According to some embodiments of the invention, the single site catalyst precursor compound is represented by the formula:

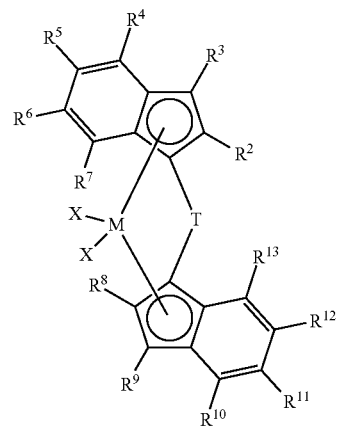

where M is a group 4, 5, or 6 metal; T is a bridging group; each X is, independently, an anionic leaving group; each $R^2$, $R^3$, $R^4$, $R^5$, $R^6$, $R^7$, $R^8$, $R^9$, $R^{10}$, $R^{11}$, $R^{12}$, and $R^{13}$ is, independently, halogen atom, hydrogen, hydrocarbyl, substituted hydrocarbyl, halocarbyl, substituted halocarbyl, silylcarbyl, substituted silylcarbyl, germylcarbyl, substituted germylcarbyl substituent or a —NR'$_2$, —SR', —OR', —OSiR'$_3$ or —PR'$_2$ radical, wherein R' is one of a halogen atom, a $C_1$-$C_{10}$ alkyl group, or a $C_6$-$C_{10}$ aryl group.

According to some embodiments of the invention, at least one of $R^2$, $R^3$, $R^4$, $R^5$, $R^6$, $R^7$, $R^8$, $R^9$, $R^{10}$, $R^{11}$, $R^{12}$, and $R^{13}$ is a cyclopropyl substituent represented by the formula:

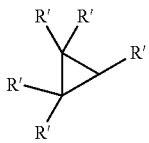

wherein each R' in the cyclopropyl substituent is, independently, hydrogen, a substituted hydrocarbyl group, an unsubstituted hydrocarbyl group, or a halogen.

According to some embodiments of the invention, the M is selected from titanium, zirconium, hafnium, vanadium, niobium, tantalum, chromium, molybdenum and tungsten; each X is independently selected from hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups, and substituted or unsubstituted $C_7$ to $C_{40}$ arylalkenyl groups; or, optionally, are joined together to form a $C_4$ to $C_{40}$ alkanediyl group, or a conjugated $C_4$ to $C_{40}$ diene ligand, which is coordinated to M in a metallacyclopentene fashion; or, optionally, represent a conjugated diene, optionally, substituted with one or more groups independently selected from hydrocarbyl, trihydrocarbylsilyl, and trihydrocarbylsilylhydrocarbyl groups, said diene having a total of up to 40 atoms not counting hydrogen and forming a π complex with M; each $R^2$, $R^4$, $R^8$, and $R^{10}$ is independently selected from hydrogen, halogen, substituted or unsubstituted $C_1$ to $C_{10}$ alkyl groups, substituted or unsubstituted $C_6$ to $C_{14}$ aryl groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups, substituted or unsubstituted $C_8$ to $C_{40}$ arylalkenyl groups, and —NR'$_2$, —SR', —OR', —SiR'$_3$, —OSiR'$_3$, and —PR'$_2$ radicals wherein each R' is independently selected from halogen, substituted or unsubstituted $C_1$ to $C_{10}$ alkyl groups and substituted or unsubstituted $C_6$ to $C_{14}$ aryl groups; $R^3$, $R^5$, $R^6$, $R^7$, $R^9$, $R^{11}$, $R^{12}$, and $R^{13}$ are each selected from the group consisting of hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups, and $C_7$ to $C_{40}$ substituted or unsubstituted arylalkenyl groups; and T is selected from:

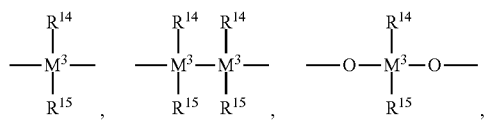

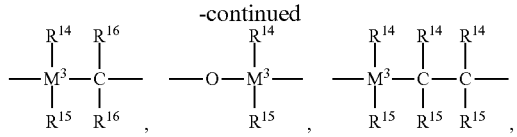

—B($R^{14}$)—, —Al($R^{14}$)—, —Ge—, —Sn—, —O—, —S—, —SO—, —SO$_2$—, —N($R^{14}$)—, —CO—, —P($R^{14}$)—, and —P(O)($R^{14}$)—; wherein $R^{14}$, $R^{15}$, and $R^{16}$ are each independently selected from hydrogen, halogen, $C_1$ to $C_{20}$ alkyl groups, $C_6$ to $C_{30}$ aryl groups, $C_1$ to $C_{20}$ alkoxy groups, $C_2$ to $C_{20}$ alkenyl groups, $C_7$ to $C_{40}$ arylalkyl groups, $C_8$ to $C_{40}$ arylalkenyl groups, and $C_7$ to $C_{40}$ alkylaryl groups, optionally, $R^{14}$ and $R^{15}$, together with the atom(s) connecting them, form a ring; and $M^3$ is selected from carbon, silicon, germanium, and tin; or T is represented by the formula:

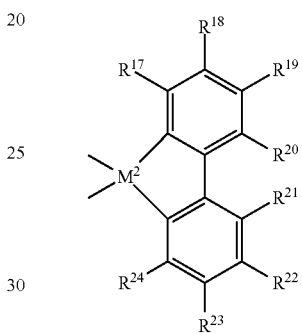

wherein $R^{17}$, $R^{18}$, $R^{19}$, $R^{20}$, $R^{21}$, $R^{22}$, $R^{23}$, and $R^{24}$ are each independently selected from hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ alkylaryl groups, substituted or unsubstituted $C_7$ to $C_{40}$ alkylaryl groups, and substituted or unsubstituted $C_8$ to $C_{40}$ arylalkenyl groups; optionally, two or more adjacent radicals $R^{17}$, $R^{18}$, $R^{19}$, $R^{20}$, $R^{21}$, $R^{22}$, $R^{23}$, and $R^{24}$, including $R^{20}$ and $R^{21}$, together with the atoms connecting them, form one or more rings; and $M^2$ represents one or more carbon atoms, or a silicon, germanium, or tin atom.

In some embodiments, two or more different catalyst compounds are present in the catalyst systems used herein. In some embodiments, two or more different catalyst systems are present in the reaction zone where the process(es) described herein occur. When two transition metal compound based catalysts are used in one reactor as a mixed catalyst system, the two transition metal compounds should be chosen such that the two are compatible. A simple screening method such as by $^1$H or $^{13}$C NMR, known to those of ordinary skill in the art, can be used to determine which transition metal compounds are compatible.

The two transition metal compounds (pre-catalysts) may be used in any ratio. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. Useful mole percentages, based upon the molecular weight of the pre-catalysts, are 10 to 99.9 mol % A to 0.1 to 90 mol % B, alternatively 25 to 99 mol % A to 0.5 to 50 mol % B, alternatively 50 to 99 mol % A to 1 to 25 mol % B, and alternatively 75 to 99 mol % A to 1 to 10 mol % B.

In any embodiment of the invention, in any embodiment of any formula described herein, M may be Zr or Hf.

In any embodiment of the invention in any embodiment of any formula described herein, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system), preferably each X is independently selected from halides and $C_1$ to $C_5$ alkyl groups, preferably each X is a methyl group.

In a preferred embodiment of the invention in any embodiment of any formula described herein, each $R^3$, $R^5$, $R^6$, $R^7$, $R^9$, $R^{11}$, $R^{12}$, or $R^{13}$ is, independently, hydrogen or a substituted hydrocarbyl group or unsubstituted hydrocarbyl group, or a heteroatom, preferably hydrogen, methyl, ethyl, propyl, butyl, pentyl, hexyl, or an isomer thereof.

In a preferred embodiment of any formula described herein, each $R^3$, $R^4$, $R^5$, $R^6$, $R^7$, $R^9$, $R^{10}$, $R^{11}$, $R^{12}$, or $R^{13}$ is, independently selected from hydrogen, methyl, ethyl, phenyl, benzyl, cyclobutyl, cyclopentyl, cyclohexyl, naphthyl, anthracenyl, carbazolyl, indolyl, pyrrolyl, cyclopenta[b]thiopheneyl, fluoro, chloro, bromo, iodo, and isomers of propyl, butyl, pentyl, hexyl, heptyl, octyl, nonyl, decyl, methylphenyl, dimethylphenyl, ethylphenyl, diethylphenyl, propylphenyl, dipropylphenyl, butylphenyl, dibutylphenyl, methylbenzyl, methylpyrrolyl, dimethylpyrrolyl, methylindolyl, dimethylindolyl, methylcarbazolyl, dimethylcarbazolyl, methylcyclopenta[b]thiopheneyl dimethylcyclopenta[b]thiopheneyl.

In an embodiment of the invention in any embodiment of any formula described herein, T is a bridging group and comprises Si, Ge, or C, preferably T is dialkyl silicon or dialkyl germanium, preferably T is dimethyl silicon.

In an embodiment of the invention in any embodiment of any formula described herein, T is a bridging group and is represented by $R'_2C$, $R'_2Si$, $R'_2Ge$, $R'_2CCR'_2$, $R'_2CCR'_2CR'_2$, $R'_2CCR'_2CR'_2CR'_2$, $R'C$=$CR'$, $R'C$=$CR'CR'_2$, $R'_2CCR'$=$CR'CR'_2$, $R'C$=$CR'CR'$=$CR'$, $R'C$=$CR'CR'_2CR'_2$, $R'_2CSiR'_2$, $R'_2SiSiR'_2$, $R_2CSiR'_2CR'_2$, $R'_2SiCR'_2SiR'_2$, $R'C$=$CR'SiR'_2$, $R'_2CGeR'_2$, $R'_2GeGeR'_2$, $R'_2CGeR'_2CR'_2$, $R'_2GeCR'_2GeR'_2$, $R'_2SiGeR'_2$, $R'C$=$CR'GeR'_2$, $R'B$, $R'_2C$—$BR'$, $R'_2C$—$BR'$—$CR'_2$, $R'_2C$—$O$—$CR'_2$, $R'_2CR'_2C$—$O$—$CR'_2CR'_2$, $R'_2C$—$O$—$CR'_2CR'_2$, $R'_2C$—$O$—$CR'$=$CR'$, $R'_2C$—$S$—$CR'_2$, $R'_2CR'_2C$—$S$—$CR'_2CR'_2$, $R'_2C$—$S$—$CR'_2CR'_2$, $R'_2C$—$S$—$CR'$=$CR'$, $R'_2C$—$Se$—$CR'_2$, $R'_2CR'_2C$—$Se$—$CR'_2CR'_2$, $R'_2C$—$Se$—$CR'_2CR'_2$, $R'_2C$—$Se$—$CR'$=$CR'$, $R'_2C$—$N$=$CR'$, $R'_2C$—$NR'$—$CR'_2$, $R'_2C$—$NR'$—$CR'_2CR'_2$, $R'_2C$—$NR'$—$CR'$=$CR'$, $R'_2CR'_2C$—$NR'$—$CR'_2CR'_2$, $R'_2C$—$P$=$CR'$, or $R'_2C$—$PR'$—$CR'_2$, where each R' is, independently, hydrogen or a $C_1$ to $C_{20}$ containing hydrocarbyl, substituted hydrocarbyl, halocarbyl, substituted halocarbyl, silylcarbyl or germylcarbyl substituent, and, optionally, two or more adjacent R' may join to form a substituted or unsubstituted, saturated, partially unsaturated or aromatic, cyclic or polycyclic substituent. Preferably, T is $CH_2$, $CH_2CH_2$, $C(CH_3)_2$, $SiMe_2$, $SiPh_2$, $SiMePh$, silylcyclobutyl ($Si(CH_2)_3$), $(Ph)_2C$, $(p$-$(Et)_3SiPh)_2C$, cyclopentasilylene ($Si(CH_2)_4$), or $Si(CH_2)_5$.

In embodiments of the invention, in any formula described herein, each $R^2$ and $R^8$, is independently, a $C_1$ to $C_{20}$ hydrocarbyl, or a $C_1$ to $C_{20}$ substituted hydrocarbyl, $C_1$ to $C_{20}$ halocarbyl, $C_1$ to $C_{20}$ substituted halocarbyl, $C_1$ to $C_{20}$ silylcarbyl, $C_1$ to $C_{20}$ substituted silylcarbyl, $C_1$ to $C_{20}$ germylcarbyl, or $C_1$ to $C_{20}$ substituted germylcarbyl substituents. Preferably, each $R^2$ and $R^8$, is independently, methyl, ethyl, propyl, butyl, pentyl, hexyl, heptyl, octyl, nonyl, decyl, undecyl, dodecyl or an isomer thereof, preferably cyclopropyl, cyclohexyl, (1-cyclohexyl methyl) methyl, isopropyl, and the like.

In embodiments of the invention, in any embodiment of any formula described herein, $R^4$ and $R^{10}$ are, independently, a substituted or unsubstituted aryl group. Preferred substituted aryl groups include aryl groups where a hydrogen has been replaced by a hydrocarbyl, or a substituted hydrocarbyl, halocarbyl, substituted halocarbyl, silylcarbyl, substituted silylcarbyl, germylcarbyl, or substituted germylcarbyl substituents, a heteroatom or heteroatom-containing group.

In a preferred embodiment of the invention in any embodiment of any formula described herein, $R^2$ and $R^8$ are a $C_1$ to $C_{20}$ hydrocarbyl, such as methyl, ethyl, propyl, butyl, pentyl, hexyl, heptyl, octyl, nonyl, decyl, undecyl, dodecyl or an isomer thereof, preferably cyclopropyl, cyclohexyl, (1-cyclohexyl methyl) methyl, or isopropyl; and $R^4$ and $R^{10}$ are independently selected from phenyl, naphthyl, anthracenyl, 2-methylphenyl, 3-methylphenyl, 4-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4,5-trimethylphenyl, 2,3,4,5,6-pentamethylphenyl, 2-ethylphenyl, 3-ethylphenyl, 4-ethylphenyl, 2,3-diethylphenyl, 2,4-diethylphenyl, 2,5-diethylphenyl, 2,6-diethylphenyl, 3,4-diethylphenyl, 3,5-diethylphenyl, 3-isopropylphenyl, 4-isopropylphenyl, 3,5-di-isopropylphenyl, 2,5-di-isopropylphenyl, 2-tert-butylphenyl, 3-tert-butylphenyl, 4-tert-butylphenyl, 3,5-di-tert-butylphenyl, 2,5-di-tert-butylphenyl, cyclopropyl, cyclobutyl, cyclopentyl, cyclohexyl, carbazolyl, indolyl, pyrrolyl, or cyclopenta[b]thiopheneyl. In a preferred embodiment, $R^2$, $R^8$, $R^4$ and $R^{10}$ are as described in the preceding sentence and $R^3$, $R^5$, $R^6$, $R^7$, $R^9$, $R^{11}$, $R^{12}$, and $R^{13}$ are hydrogen.

In embodiments according to the present invention, suitable MCN compounds are represented by the formula (1):

or the formula (1c):

wherein: e is 1 or 2; T is a bridging group between two A groups; each A is a substituted monocyclic or polycyclic ligand that is pi-bonded to M and, optionally, includes one or more ring heteroatoms selected from boron, a group 14 atom that is not carbon, a group 15 atom, or a group 16 atom, and when e is 2 each A may be the same or different, provided that at least one A is substituted with at least one cyclopropyl substituent directly bonded to any $sp^2$ carbon atom at a bondable ring position of the ligand, wherein the cyclopropyl substituent is represented by the formula:

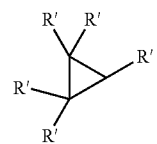

where each R' is, independently, hydrogen, a substituted or unsubstituted hydrocarbyl group, or a halogen; M is a transition metal atom having a coordination number of n and selected from group 3, 4, or 5 of the Periodic Table of Elements, or a lanthanide metal atom, or actinide metal atom; n is 3, 4, or 5; and each X is a univalent anionic ligand, or two X's are joined and bound to the metal atom to form a metallocycle ring, or two X's are joined to form a chelating ligand, a diene ligand, or an alkylidene ligand.

In embodiments according to the present invention, the MCN compound may be represented by the formula:

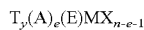

where E is $J\text{-}R''_{x\text{-}1\text{-}y}$, J is a heteroatom with a coordination number of three from group 15 or with a coordination number of two from group 16 of the Periodic Table of Elements; R" is a $C_1$-$C_{100}$ substituted or unsubstituted hydrocarbyl radical; x is the coordination number of the heteroatom J where "x-1-y" indicates the number of R" substituents bonded to J; T is a bridging group between A and E, A and E are bound to M, y is 0 or 1; and A, e, M, X, and n are as defined above.

In embodiments according to the present invention, the MCN compound may be represented by one of the following formulae:

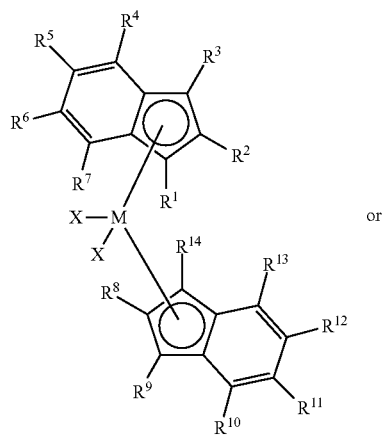

formula (1a)

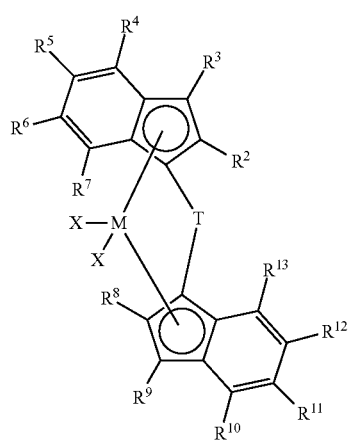

formula (1b)

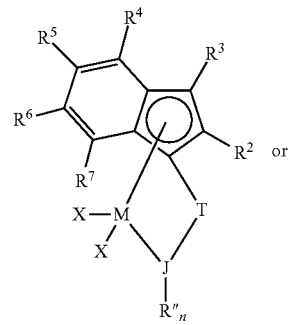

formula (2a)

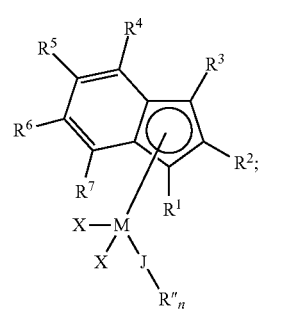

formula (2b)

where M, T, X, are as defined in claim 1; J, R", and n are as defined above, and each $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$ is, independently, hydrogen, a substituted hydrocarbyl group, an unsubstituted hydrocarbyl group, or a halide, provided that in formula 1a and 1b, at least one of $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$ is a cyclopropyl substituent and in formula 2a and 2b at least one of $R^1$, $R^2$, $R^3$, $R^4$, $R^5$, $R^6$, or $R^7$, is a cyclopropyl substituent; and provided that any adjacent $R^1$ to $R^{14}$ groups that are not a cyclopropyl substituent, may form a fused ring or multicenter fused ring system where the rings may be aromatic, partially saturated, or saturated.

In embodiments according to the present invention, at least one A is a monocyclic ligand selected from the group consisting of substituted or unsubstituted cyclopentadienyl, heterocyclopentadienyl, and heterophenyl ligands provided that when e is one, the monocyclic ligand is substituted with at least one cyclopropyl substituent, at least one A is a polycyclic ligand selected from the group consisting of substituted or unsubstituted indenyl, fluorenyl, cyclopenta[a]naphthyl, cyclopenta[b]naphthyl, heteropentalenyl, heterocyclopentapentalenyl, heteroindenyl, heterofluorenyl, heterocyclopentanaphthyl, heterocyclopentaindenyl, and heterobenzocyclopentaindenyl ligands.

MCN compounds suitable for use herein may further include one or more of: dimethylsilylene-bis(2-cyclopropyl-4-phenylindenyl)zirconium dichloride; dimethylsilylene-bis(2-cyclopropyl-4-phenylindenyl)hafnium dichloride; dimethylsilylene-bis(2-methyl-4-phenylindenyl)zirconium dichloride; dimethylsilylene-bis(2-methyl-4-phenylindenyl)hafnium dichloride; dimethylsilylene-bis(2-methyl-4-orthobiphenylindenyl)hafnium dichloride; dimethylsilylene-bis(2-methyl-4-orthobiphenylindenyl)zirconium dichloride; dimethylsilylene-(2-cyclopropyl-4-orthobiphenylindenyl)(2-methyl-4-3',5'-di-t-butylphenylindenyl)hafnium dichloride; dimethylsilylene-(2-cyclopropyl-4-orthobiphenylindenyl)(2-methyl-4-3',5'-di-t-butylphenylindenyl)zirconium dichloride; dimethylsilylene-(2-isopropyl-4(4-t-butyl)phenyl)indenyl) (2-methyl-4-phenyl indenyl) zirconium dichloride; dimethylsilylene-(2-isopropyl-4(4-t-butyl)phenyl)indenyl) (2-methyl-4-phenyl indenyl) hafnium dichloride; dimethylsilylene-(2-isopropyl-4(4-t-butyl)phenyl)indenyl) (2-methyl, 4-t-butylindenyl) zirconium dichloride; dimethylsilylene-(2-isopropyl-4(4-t-butyl)phenyl)indenyl) (2-methyl, 4-t-butylindenyl) hafnium dichloride; dimethylsilylene-(2-isopropyl-4(4-t-butyl)phenyl)indenyl) (2-methyl-4-phenylindacenyl) zirconium dichloride; dimethylsilylene-(2-isopropyl-4(4-t-butyl)phenyl)indenyl) (2-methyl-4-phenylindacenyl) hafnium dichloride; dimethylsilylene (4-o-Biphenyl-2-(1-methylcyclohexyl)methyl-indenyl) (4-(3,5-di-tert-butylphenyl)-2-methyl-indenyl) zirconium dichloride; and dimethylsilylene (4-o-Biphenyl-2-(1-methylcyclohexyl)methyl-indenyl) (4-(3,5-di-tert-butylphenyl)-2-methyl-indenyl) hafnium dichloride; where, in alternate embodiments, the dichloride in any of the compounds listed above may be replaced with dialkyl (such as dimethyl), dialkaryl, diflouride, diiodide, or dibromide, or a combination thereof.

Chain Transfer Agents:

This invention further relates to methods to polymerize olefins using the above complex in the presence of a chain transfer agent ("CTA"). The CTA can be any desirable chemical compound such as those disclosed in WO 2007/130306. Preferably, the CTA is selected from Group 2, 12, or 13 alkyl or aryl compounds; preferably zinc, magnesium or aluminum alkyls or aryls; preferably where the alkyl is a $C_1$ to $C_{30}$ alkyl, alternately a $C_2$ to $C_{20}$ alkyl, alternately a $C_3$ to $C_{12}$ alkyl, typically selected independently from methyl, ethyl, propyl, butyl, isobutyl, tertbutyl, pentyl, hexyl, cyclohexyl, phenyl, octyl, nonyl, decyl, undecyl, and dodecyl; e.g., dialkyl zinc compounds, where the alkyl is selected independently from methyl, ethyl, propyl, butyl, isobutyl, tertbutyl, pentyl, hexyl, cyclohexyl, and phenyl, where diethylzinc is particularly preferred; or e.g., trialkyl aluminum compounds, where the alkyl is selected independently from methyl, ethyl, propyl, butyl, isobutyl, tertbutyl, pentyl, hexyl, cyclohexyl, and phenyl; or e.g., diethyl aluminum chloride, diisobutylaluminum hydride, diethylaluminum hydride, di-n-octylaluminum hydride, dibutylmagnesium, diethylmagnesium, dihexylmagnesium, and triethylboron.

Useful CTAs are typically present at from 10 or 20 or 50 or 100 equivalents to 600 or 700 or 800 or 1000 equivalents relative to the catalyst component. Alternately the CTA is preset at a catalyst complex-to-CTA molar ratio of from about 1:3000 to 10:1; alternatively 1:2000 to 10:1; alternatively 1:1000 to 10:1; alternatively, 1:500 to 1:1; alternatively 1:300 to 1:1; alternatively 1:200 to 1:1; alternatively 1:100 to 1:1; alternatively 1:50 to 1:1; or/and alternatively 1:10 to 1:1.

Monomers:

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene, and isomers thereof. In a preferred embodiment, the monomer comprises propylene and optional comonomer(s) comprising one or more of ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may, optionally, include heteroatoms and/or one or more functional groups. In a preferred embodiment of the invention, the monomer is propylene and no comonomer is present.

Exemplary $C_2$ to $C_{40}$ olefin monomers and, optional, comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

One or more dienes may be present in the polymer produced herein at up to 10 wt %, preferably at 0.00001 to 1.0 wt %, preferably 0.002 to 0.5 wt %, even more preferably 0.003 to 0.2 wt %, based upon the total weight of the composition. In some embodiments 500 ppm or less of diene is added to the polymerization, preferably 400 ppm or less, preferably 300 ppm or less. In other embodiments, at least 50 ppm of diene is added to the polymerization, or 100 ppm or more, or 150 ppm or more.

Diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). The diolefin monomers may be selected from alpha, omega-diene monomers (i.e., di-vinyl monomers). The diolefin monomers may be linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene, or higher ring containing diolefins with or without substituents at various ring positions.

The polymerization or copolymerization may be carried out using olefins such as ethylene, propylene, 1-butene, 1-hexene, 4-methyl-1-pentene, and 1-octene, vinylcyclohexane, norbornene, and norbornadiene. In particular, propylene and ethylene are polymerized.

Preferably, the comonomer(s) are present in the final propylene polymer composition at less than 50 mol %, preferably from 0.5 to 45 mol %, preferably from 1 to 30 mol %, preferably from 3 to 25 mol %, preferably from 5 to 20 mol %, preferably from 7 to 15 mol %, with the balance of the copolymer being made up of the main monomer (e.g., propylene).

Polymerization:

The invention relates to polymerization processes where monomer and, optionally, comonomer are contacted with a catalyst system comprising an activator and at least one metallocene compound, as described above. The catalyst compound and activator may be combined in any order, and are combined typically prior to contacting with the monomer.

Polymerization processes of this invention can be carried out in any manner known in the art. Any suspension, homogeneous, bulk, solution, slurry, or gas phase polymerization process known in the art can be used. Such processes can be run in a batch, semi-batch, or continuous mode. Homogeneous polymerization processes and slurry processes are useful. (A homogeneous polymerization process is defined to be a process where at least 90 wt % of the product is soluble in the reaction media.) A bulk homogeneous process is also useful. (A bulk process is defined to be a process where monomer concentration in all feeds to the reactor is 70 vol % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt %, based upon the weight of the solvents.

Polymerizations can be run at any temperature and/or pressure suitable to obtain the desired ethylene polymers. Typical temperatures and/or pressures include a temperature in the range of from about 0° C. to about 300° C., preferably about 20° C. to about 200° C., preferably about 35° C. to about 150° C., preferably from about 40° C. to about 120° C., preferably from about 45° C. to about 80° C.; and a pressure in the range of from about 0.35 MPa to about 10 MPa, preferably from about 0.45 MPa to about 6 MPa, or preferably from about 0.5 MPa to about 4 MPa.

Propylene polymer compositions, according to embodiments of the invention, may be prepared using conventional polymerization processes such as a two-stage process in two reactors or a three-stage process in three reactors, although it is also possible to produce these compositions in a single reactor. Each stage may be independently carried out in either the gas, solution, or liquid slurry phase. For example, the first stage may be conducted in the gas phase and the second in liquid slurry, or vice versa, and the, optional, third stage in gas or slurry phase. Alternatively, each phase may be the same in the various stages. Propylene polymer compositions of this invention can be produced in multiple reactors, such as two or three, operated in series, where a component is polymerized first in a gas phase, liquid slurry or solution polymerization process and another component is polymerized in a second reactor such as a gas phase or slurry phase reactor.

The stages of the processes of this invention can be carried out in any manner known in the art, in solution, in suspension or in the gas phase, continuously or batch wise, or any combination thereof, in one or more steps. The term "gas phase polymerization" refers to the state of the monomers during polymerization, where the "gas phase" refers to the vapor state of the monomers. In another embodiment, a slurry process is used in one or more stages. As used herein the term "slurry polymerization process" means a polymerization process where a supported catalyst is employed and monomers are polymerized on the supported catalyst particles, and at least 95 wt % of polymer products derived from the supported catalyst are in granular form as solid particles (not dissolved in the diluent). Gas phase polymerization processes can be used in one or more stages.

The productivity of the catalyst system in a single stage or in all stages combined may be at least 50, 500, 800, 5000, 10,000 or 20,000 g(polymer)/g(cat)/hour.

Polymer Products:

The processes described herein can produce a variety of polymer products, including but not limited to ethylene and propylene homopolymers and copolymers. The polymers produced may be homopolymers of ethylene or propylene or copolymers of ethylene preferably having from 0 to 25 mol % (alternately from 0.5 to 20 mol %, alternately from 1 to 15 mol %, preferably from 3 to 10 mol %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene), or are copolymers of propylene preferably having from 0 to 25 mol % (alternately from 0.5 to 20 mol %, alternately from 1 to 15 mol %, preferably from 3 to 10 mol %) of one or more of $C_2$ or $C_4$ to $C_{20}$ olefin comonomer (preferably ethylene or $C_4$ to $C_{12}$ alpha-olefin, preferably ethylene, butene, hexene, octene, decene, dodecene, preferably ethylene, butene, hexene, octene).

The polymers may comprise polypropylene, for example, iPP, highly isotactic polypropylene, sPP, hPP, and RCP. The propylene polymer may also be heterophasic. The propylene polymer may also be an impact copolymer (ICP). The ICP comprises a blend of iPP, preferably with a $T_m$ of 120° C. or more, with a propylene polymer with a glass transition temperature ($T_g$) of −30° C. or less and/or an ethylene polymer.

The polymer produced herein may be combined with one or more additional polymers prior to being formed into a film, molded part, or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

EXPERIMENTAL

Silica was obtained from the Asahi Glass Co., Ltd. or AGC Chemicals Americas, Inc. (D100-100A, D150-60A), PQ Corporation (PD 14024, MS 3065), Fuji Silysia Chemical Ltd. (P-3), and Davison Chemical Division of W.R. Grace and Company (G 948). MAO was obtained as a 30 wt % MAO in toluene solution from Albemarle (13.5 wt % Al or 5.0 mmol/g).

Calcination of Raw Silica:

Raw silica was calcined in a CARBOLITE Model VST 12/600 tube furnace using a EUROTHERM 3216P1 temperature controller, according to the following procedure. The controller was programmed with the desired temperature profile. A quartz tube was filled with 100 g silica, and a valve was opened and adjusted to flow the nitrogen through the tube so that the silica was completely fluidized. The quartz tube was then placed inside the heating zone of the furnace. The silica was heated slowly to the desired temperature and held at this temperature for at least 8 hours to allow complete calcination and removal of water or moisture. After the dehydration was complete, the quartz tube was cooled to ambient temperature. Calcined silica was recovered in a silica catcher, and collected into a glass container inside a dry box. Diffuse reflectance infrared Fourier transform spectroscopy (DRIFTS) was used as a quality control check. The different silicas used in some of the following examples and their calcination conditions are listed in Table 1.

Supported MAO (sMAO) was prepared at reaction initiation temperatures of −20° C. to RT to reduce the risk of fragmentation of high SA, small PD silica upon reaction with MAO; or at temperatures up to 100° C. or more, to facilitate higher MAO loading and/or stronger fixation to minimize MAO leaching from the support. The sMAO preparation conditions are listed in Table 2.

sMAO Method A (CsMAO1, sMAO 1-4a, sMAO 5-7):

For high temperature sMAO preparation, the following or a similar procedure was used. X g of silica was slurried in a reactor with 10× g toluene (see Table 2 for X). All slurry and solvent liquid ratios are given as weight ratios relative to the starting silica material, e.g., raw silica or silica supported MAO and/or catalyst. The reactor was stirred at 500 rpm. Cold (−20° C.) 30 wt % MAO at an amount of X*Y mmol Al based on Y mmol Al/g silica (see Table 2 for Y) was added slowly to maintain the temperature of the reactor at or below 40° C. The reactor was stirred for 30 minutes at 350 rpm at RT and then heated at 100° C. for 3 hours. The slurry was cooled to ambient temperature and filtered through a fine frit. The wet solid was washed with 10× g toluene and then 10× g hexane twice, and then dried under vacuum for 3 hours, yielding Z g dry sMAO (see Table 2 for Z).

sMAO Method B (sMAO4b):

For low temperature sMAO preparation to minimize sMAO fragmentation, the following or a similar procedure was used. X g silica was slurried in a reactor with 10× g toluene (see Table 2 for X). The reactor was chilled in a freezer to −20° C. or maintained at RT. The reactor was stirred at 500 rpm. Cold (−20° C.) 30 wt % MAO was added slowly to the reactor to maintain the temperature below 40° C., and then the reactor was stirred at 350 rpm at RT for 3 hours. The mixture was filtered through a medium frit, and the wet solid washed with 10× toluene and then 10× hexane, and dried under a vacuum for 3 hours, yielding Z g dry sMAO (see Table 2 for Z).

TABLE 1

Silica Properties and Calcination Temperatures

| Support | $SiO_2$ | Tc (° C.) | PS (um) | SA ($m^2$/g) | PV (mL/g) | PD (nm (Å)) |
|---|---|---|---|---|---|---|
| CS1 | G 948 | 600 | 58 | 278 | 1.68 | 24.2 (242) |
| S1 | PD 14024 | 200 | 85 | 611 | 1.40 | 9.2 (92) |
| S2 | D100-100A | 200 | 100 | 543 | 1.51 | 11.1 (111) |
| S3 | P-3 | 200 | 33 | 690 | 1.13 | 6.6 (66) |
| S4a | D150-60A | 200 | 150 | 733 | 1.17 | 6.4 (64) |
| S4b | D150-60A | 600 | 150 | 733 | 1.17 | 6.4 (64) |
| S5 | MS 3065 | 200 | 90 | 650 | 3.0 | 18.5 (185) |
| S6 | PD 13054 | 200 | 130 | 671 | 1.11 | 6.6 (66) |
| S7 | D70-120A | 600 | 70 | 450 | 1.64 | 14.6 (146) |

Tc—Calcination temperature;
PS—average particle size (from manufacturer);
SA—BET surface area (from manufacturer);
PV—pore volume (from manufacturer);
PD—pore diameter (from manufacturer)

TABLE 2

Supported MAO Preparation

| sMAO # | Silica # | X Silica (g) | MAO[a] (Y mmol Al/g) | T1[b] (° C.) | Time[c] (hr) | Z Yield (g) | MAO Loading[d] (mmol Al/g silica) | MAO Loading[e] (wt %) |
|---|---|---|---|---|---|---|---|---|
| CsMAO1 | CS1 | 5.0 | 9.5 | 100 | 3 | 7.07 | 7.02 | 29.3 |
| sMAO1 | S1 | 10.05 | 13 | 100 | 3 | 17.85 | 13.2 | 41.2 |

TABLE 2-continued

Supported MAO Preparation

| sMAO # | Silica # | X Silica (g) | MAO[a] (Y mmol Al/g) | T1[b] (° C.) | Time[c] (hr) | Z Yield (g) | MAO Loading[d] (mmol Al/g silica) | MAO Loading[e] (wt %) |
|---|---|---|---|---|---|---|---|---|
| sMAO2 | S2 | 1.00 | 13 | 100 | 3 | 1.70 | 11.9 | 41.2 |
| sMAO3 | S3 | 1.04 | 13 | 100 | 3 | 1.81 | 12.5 | 42.5 |
| sMAO4a | S4a | 5.08 | 11.5 | 100 | 3 | 8.61 | 11.8[f] | 41.0 |
| xMAO4b | S4b | 5.0 | 7.0 | −20 | 3 | 7.00 | 6.8 | 28.6 |
| sMAO5 | S5 | 5.12 | 15 | 100 | 3 | 9.54 | 14.6 | 46.3 |
| sMAO6 | S6 | 5.04 | 11 | 100 | 3 | 8.42 | 11.4[f] | 40.1 |
| sMAO7 | S7 | 10.0 | 12 | 100 | 3 | 18.06 | 13.7 | 44.6 |

[a]MAO charge in total mmol Al/g silica;
[b]Reaction temperature T1 after MAO addition;
[c]Reaction time at T1;
[d]MAO loading as mmol Al/g silica, calculated as $((Z - X)/59)/X$, where 59 is the estimated Mw of MAO on silica;
[e]MAO loading as wt % of total sMAO weight, calculated as $(Z - X)/Z$; and
[f]MAO solid leaching occurred.

Example CsMAO1 in Table 2 shows that the conventional silica, G 948, has an MAO loading that is substantially less than almost all of the other examples in the table.

Example sMAO1 uses PD 14024. FIG. 1 is an electron micrograph of PD 14024, a high surface area silica with a pore volume that is just slightly lower than the conventional silica G 948. The pore diameter, therefore, is much smaller than that of G 948, but still sufficient for the MAO molecules to enter the pores leading to a high MAO loading. FIG. 2 is an electron micrograph of the MAO supported on PD 14024 silica, with an aluminoxane loading of 13.2 mmol Al/g silica. The aluminoxane loading is high and particle fragmentation and MAO leaching are not observed. FIG. 3 is a plot of the pore diameter distribution for raw PD 14024 silica versus the pore diameter distributions for MAO supported on PD 14024 silica at aluminoxane loadings of about 9, 11, and 13 mmol Al/g silica. FIG. 3 shows that a significant portion of the incremental pore volume in the raw PD 14024 silica is comprised of pores having a pore diameter larger than about 100 Angstrom. This will be discussed further below.

Example sMAO2 uses D 100-100A silica with a slightly lower surface area than PD 14024 but similar pore volume and thus slightly larger pore diameter. The MAO loading is slightly lower than PD 14024 in sMAO1 likely due to the smaller surface area, but still improved over the G 948 conventional silica. Particle fragmentation and MAO leaching were not observed.

Example sMAO3 uses P-3 silica with a very high surface area. FIG. 4 is an electron micrograph showing raw P-3 silica particles. The pore volume has to be reduced to maintain mechanical strength, resulting in a pore diameter of only about 66 Angstrom. FIG. 5 is an electron micrograph of the MAO supported on Fuji P-3 silica, with an aluminoxane loading of 12.5 mmol Al/g silica. Although the aluminoxane loading for this silica is quite high, FIG. 5 when compared with FIG. 4 shows that sMAO particle fragmentation has occurred. This fragmentation is likely related to MAO because the silica without MAO can be calcined at 600° C. and no fragmentation is observed.

Example sMAO4a uses D150-60A silica with an even higher surface area than the P-3 silica of sMAO3. FIG. 6 is an electron micrograph showing raw D150-60A silica particles. FIG. 7 is an electron micrograph of the MAO supported on D150-60A silica, with an aluminoxane loading of 11.8 mmol Al/g silica. Although the MAO loading for this silica is high, FIG. 7 shows that particle fragmentation and MAO solid leaching have occurred. This fragmentation is again likely related to MAO because the silica without MAO can be calcined at 600° C. and no fragmentation is observed.

For comparison with sMAO4a, Example sMAO4b uses the same silica. In sMAO4b the fragmentation and leaching are controlled by reducing the reaction temperature to a value from −20° C. to RT. FIG. 8 is an electron micrograph of MAO supported on D150-60A silica prepared at lower temperature, showing that particle fragmentation is minimal and MAO leaching is not observed. However, the aluminoxane loading in Example sMAO4b is much smaller. It is possible that the very large particle size of the silica in sMAO4b may be the reason why at reaction temperatures of from −20° C. to RT the particles do not fragment. The pore diameter is so small and the pores are so deep that MAO molecules may only reach partially to the end of the pores and block further aluminoxane loading. A higher reaction temperature may cause fragmentation and open the pore structure to enable higher aluminoxane loading.

By comparing Examples sMAO 4b and SMAO4a, the increase in aluminoxane loading due to the change in preparation process can be evaluated. Example sMAO4b, using the low temperature preparation process where the reaction temperature is maintained below about 40° C., has an aluminoxane loading of only about 6.8 mmol Al/g silica. As noted above, FIG. 8 shows that the resulting sMAO does not show significant fragmentation or solid MAO leaching. Example sMAO4a, using the same silica with the high temperature preparation process where the reaction temperature is allowed to exceed 40° C. has an aluminoxane loading of 11.8 mmol Al/g silica. Thus, the aluminoxane loading is increased by about 5.0 mmol Al/g silica, and FIG. 7 shows that solid MAO leaching is observed.

Example sMAO5 uses MS 3065 silica. FIG. 9 is an electron micrograph of the raw MS 3065 silica after a simple scratch with a lab spatula. The scratch causes significant particle fragmentation due to the high surface area and high pore volume of the silica. The aluminoxane loading in the MAO supported on MS 3065 is high, however.

As discussed above, although fragmented silica supported aluminoxanes may not be suitable for some types of catalyst preparation or polymerization reactor systems, they may be suitable for other types. For example, they may be suitable in catalyst preparation environments where high agitation power is not involved, or in polymerization reactor systems where catalyst particle size does not play a significant role or where MAO leaching is not as likely to be problematic (e.g., gas phase polymerization reactor systems).

Example sMAO6 uses PD 13054 silica. FIG. 10 is an electron micrograph of MAO supported on PD 13054 silica, with an aluminoxane loading of 11.4 mmol Al/g silica. FIG. 10 shows that MAO solid leaching has occurred.

Example sMAO7 uses D70-120A silica. The MAO supported on D70-120A silica had an aluminoxane loading of about 13.7 mmol Al/g silica, and particle fragmentation and leaching were not observed.

Example sMAO8 uses DM-M302 silica. The MAO supported on DM-M302 silica has a very high aluminoxane loading of about 19.7 mmol Al/g silica.

Catalyst Preparation:

The following general procedure or a similar procedure was used. sMAO was slurried in 4M g toluene (see Table 3). About 0.274 mmol neat TIBA/g sMAO was added slowly to the slurry with vigorous agitation for 10 min. Metallocene precursor at an amount of about N mg based on 0.0175 (mmol Zr/g sMAO) was then mixed with the TIBA-treated sMAO slurry and the mixture was agitated for 1-2 hours at RT (see Table 3). The slurry was then filtered, washed once with 5M g toluene and twice with 5M g hexane, and dried under vacuum for 2 hours, yielding O g (see Table 3). The catalyst precursor compounds used are provided in Table 4.

Polymerization Procedure:

The following general procedure or a similar procedure was used. A 2 L autoclave reactor was used. A catalyst tube was loaded with 2 mL of a 0.091 M tri-n-octylaluminum (TNOAL) solution in hexane and the solution was injected into the reactor in a nitrogen carrier. The catalyst tube was then pressurized with 152 kPa (22 psi) of hydrogen gas (2.1 mmol) which was then injected into the reactor. Next, 600 mL of propylene in a nitrogen carrier was added and the reactor was heated to 70° C. with a stir rate of 500 rpm. A mineral oil slurry containing about 45 mg of solid catalyst was then loaded into a second catalyst tube as a dry powder, and inserted into the reactor along with 200 mL of propylene. Other conditions are listed under Table 2 for each run.

TABLE 3

Catalyst Preparation and Polymerization Results

| sMAO# | Cat. | M sMAO (g) | N MCN (mg) | O Yield (g) | Activity (g/g cat/hr) |
|---|---|---|---|---|---|
| CsMAO1 | CAT2 | 1.0 | 30 | 1 | 2,710 |
| sMAO1 | CAT1 | 1.0 | 17 | 0.98 | 7,600 |
| sMAO2 | CAT2 | 8.24 | 64 | 8.30 | 8,813 |
| sMAO4a | CAT2 | 1.0 | 14 | 1.0 | 10,553 |
| sMAO4b | CAT2 | 1.0 | 14 | 1.0 | 1,596 |
| sMAO6 | CAT2 | 3.1 | 61 | 3.55 | 10,042 |

TABLE 4

Catalysts

| Catalyst | Catalyst precursor compound |
|---|---|
| CAT1 | rac-dimethylsilyl (4-o-biphenyl-2-n-hexyl-indenyl) (2-methyl-4-(3',5'-di-tert-butyl-4'-methoxy-phenyl)-indenyl) zirconium dichloride |
| CAT2 | rac-dimethylsilyl bis(2-cyclopropyl-4-(3',5'-di-tert-butylphenyl)-indenyl) zirconium dichloride |

Pore Diameter and Pore Distribution:

The experiments below were completed using a MICROMERITICS ASAP 2420 Surface Area and Porosity Analyzer. An intent of these experiments was to identify the pore distribution most useful for increasing MAO loading while limiting solid MAO leaching, with or without heating. A 2 g sample of raw silica was loaded in the sample tube and degassed at 120° C. for 4 hours, or a 2 g sample of sMAO was loaded in the sample tube and degassed at 40° C. overnight, both under vacuum. A general experimental protocol designed by MICROMERITICS was used to determine the pore volumes and pore diameters for each diameter range, and the results are shown in Table 5 below for the raw D150-60A silica.

TABLE 5

Raw Silica Porosity Data for D150-60A

| PD Range (Å) | Average PD (Å) | Incremental PV (mL/g) |
|---|---|---|
| 3384.5-1810.7 | 2155.8 | 0.00064 |
| 1810.7-955.4 | 1136.9 | 0.00094 |
| 955.4-723.4 | 806.8 | 0.00066 |
| 723.4-502.4 | 572.7 | 0.00126 |
| 502.4-295.6 | 346.2 | 0.00333 |
| 295.6-202.3 | 230.9 | 0.00533 |
| 202.3-165.6 | 180.0 | 0.00929 |
| 165.6-140.3 | 150.7 | 0.02521 |
| 140.3-123.9 | 131.0 | 0.04604 |
| 123.9-114.3 | 118.7 | 0.05800 |
| 114.3-110.6 | 112.4 | 0.02260 |
| 110.6-104.5 | 107.4 | 0.05447 |
| 104.5-99.4 | 101.8 | 0.04118 |
| 99.4-93.6 | 96.3 | 0.05663 |
| 93.6-87.9 | 90.6 | 0.06395 |
| 87.9-83.3 | 85.5 | 0.06405 |
| 83.3-79.0 | 81.1 | 0.04857 |
| 79.0-73.9 | 76.3 | 0.06078 |
| 73.9-69.4 | 71.5 | 0.06230 |
| 69.4-64.9 | 67.0 | 0.05193 |
| 64.9-59.8 | 62.1 | 0.06399 |
| 59.8-56.9 | 58.3 | 0.03246 |
| 56.9-51.9 | 54.1 | 0.05888 |
| 51.9-50.6 | 51.2 | 0.01418 |
| 50.6-45.8 | 47.9 | 0.05167 |
| 45.8-44.8 | 45.3 | 0.01053 |
| 44.8-40.0 | 42.1 | 0.04771 |
| 40.0-35.7 | 37.6 | 0.03921 |
| 35.7-32.0 | 33.6 | 0.03132 |
| 32.0-28.7 | 30.1 | 0.02525 |
| 28.7-25.6 | 26.9 | 0.02154 |
| 25.6-23.1 | 24.2 | 0.01703 |
| 23.1-20.4 | 21.5 | 0.01692 |
| 20.4-19.4 | 19.9 | 0.00613 |
| 19.4-18.4 | 18.9 | 0.00638 |
| 18.4-17.4 | 17.9 | 0.00657 |

Similar measurements were taken for raw silicas PD 14024, D100-100A, and D70-120A. For each silica, the sum of the incremental pore volumes with pore diameters larger than about 100 Angstrom are divided by the total pore volumes to obtain the percentage of the incremental pore volume having pore diameters larger than about 100 Angstrom. Results are summarized in Table 6.

TABLE 6

Pore Volume Summary

| Silica | D150-60A | D100-100A | PD 14024 | D70-120A |
|---|---|---|---|---|
| PV >100 Å PD (mL/g) | 0.27 | 1.13 | 0.64 | 1.50 |
| Total PV (mL/g) | 1.13 | 1.53 | 1.36 | 1.70 |
| Percent (%) >100 Å | 23 | 74 | 47 | 89 |

All documents described herein are incorporated by reference herein for purposes of all jurisdictions where such practice is allowed, including any priority documents, related application and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. An olefin polymerization catalyst system comprising a catalyst component and a silica supported aluminoxane, wherein the silica supported aluminoxane comprises silica gel particles having:
   a. an average surface area of from about 400 to 800 m²/g;
   b. an average pore diameter of from about 60 to 80 Angstrom; and
   c. at least 20% of the incremental pore volume comprised of pores having a pore diameter smaller than about 70 Angstrom;
   wherein the aluminoxane loading on the support is greater than 12 to 20 mmol Al/g silica.

2. The catalyst system of claim 1, wherein the aluminoxane loading on the support is greater than about 13 to 18 mmol Al/g silica.

3. The catalyst system of claim 1, wherein the aluminoxane loading on the support is greater than about 14 to 16 mmol Al/g silica.

4. The catalyst system of claim 1, wherein the aluminoxane is methylaluminoxane.

5. The catalyst system of claim 1, wherein the catalyst component comprises a single site catalyst component.

6. The catalyst system of claim 1, wherein the catalyst component comprises a metallocene catalyst component.

7. The catalyst system of claim 1, wherein the catalyst system is made by a process comprising contacting in a reactor:
   a. a silica support; and
   b. an aluminoxane;
   wherein the reactor temperature does not exceed 40° C. during the contacting.

8. The catalyst system of claim 1, wherein the catalyst system is made by a process comprising contacting in a reactor:
   a. a silica support; and
   b. an aluminoxane;
   wherein the reactor temperature is 40° C. or greater at any point during the contacting.

9. The catalyst system of claim 1, wherein the silica particles do not comprise agglomerates.

10. A method of polymerizing olefins using the catalyst system of claim 1.

11. An olefin polymerization catalyst system comprising a catalyst component and a silica supported aluminoxane, wherein the silica supported aluminoxane comprises silica gel particles having:
   a. an average surface area of from about 400 to 800 m²/g;
   b. an average pore diameter of from about 60 to 80 Angstrom; and
   c. at least 20% of the incremental pore volume comprised of pores having a pore diameter smaller than about 70 Angstrom;
   wherein the aluminoxane loading on the support is greater than 12 to 20 mmol Al/g silica; and
   the silica supported aluminoxane is prepared by a method comprising contacting:
   a. a silica support; and
   b. an aluminoxane;
   wherein when, during contacting (a) and (b), the temperature does not exceed 40° C., the porous silica support obtains a first aluminoxane loading, and when the temperature is 40° C. or greater, the porous silica support obtains a second aluminoxane loading; and the second aluminoxane loading is at least about 1.0 mmol Al/g silica or greater than the first aluminoxane loading, and the silica support comprises greater than 12 to 20 mmol Aug silica.

12. The olefin polymerization catalyst system of claim 11, comprising contacting (a) and (b) in a reactor, wherein the reactor is pre-chilled to a temperature less than 15° C.

13. The olefin polymerization catalyst system of claim 12, wherein the reactor is pre-chilled to a temperature less than −10° C.

14. The olefin polymerization catalyst system of claim 12, wherein the reactor temperature is 0° C. or less at the time of the initial contacting.

15. The olefin polymerization catalyst system of claim 12, wherein the reactor temperature is −10° C. or less at the time of the initial contacting.

16. The olefin polymerization catalyst system of claim 11, wherein the aluminoxane temperature is 0° C. or less when it is added to the reactor.

17. The olefin polymerization catalyst system of claim 11, wherein the porous silica support comprises silica gel particles having:
   a. an average surface area of from about 400 to 800m2/g;
   b. an average pore diameter of from about 60 to 80 Angstrom; and
   c. at least 20% of the incremental pore volume comprised of pores having a pore diameter smaller than about 70 Angstrom.

18. An olefin polymerization catalyst system comprising a catalyst component and a silica supported aluminoxane, wherein the silica supported aluminoxane comprises silica gel particles having:
   a. an average surface area of from about 400 to 800 m²/g;
   b. an average pore diameter of from about 60 to 80 Angstrom; and
   c. at least 20% of the incremental pore volume comprised of pores having a pore diameter smaller than about 70 Angstrom;
   wherein the aluminoxane loading on the support is greater than 12 to 20 mmol Al/g silica; and
   the silica supported aluminoxane is prepared by a method comprising contacting:
   a. a silica support; and
   b. an aluminoxane;
   wherein when, during contacting (a) and (b), the temperature does not exceed 40° C., the porous silica support obtains a first aluminoxane loading, and when the temperature is 40° C. or greater, the porous silica support obtains a second aluminoxane loading; and the second aluminoxane loading is at least about 1.0 mmol Al/g silica or greater than the first aluminoxane loading, and the silica support comprises greater than 12 to 20 mmol Al/g silica; and
   further wherein the silica supported aluminoxane is further contacted with the olefin catalyst component.

19. The olefin polymerization catalyst system of claim 18, wherein the olefin catalyst component comprises a single site catalyst component.

20. The olefin polymerization catalyst system of claim 19, wherein the olefin catalyst component comprises a metallocene catalyst component.

21. The olefin polymerization catalyst system of claim 11, wherein the second aluminoxane loading is at least about 3.0 mmol Al/g silica greater than the first aluminoxane loading.

22. The olefin polymerization catalyst system of claim 11, wherein the aluminoxane is methylaluminoxane.

23. The olefin polymerization catalyst system of claim 11, wherein the silica support does not comprise agglomerates.

24. A method for polymerizing olefins using the olefin polymerization catalyst system of claim 11.

25. A method for polymerizing olefins using the olefin polymerization catalyst system of claim 18.

26. An olefin polymerization catalyst system comprising a catalyst component and a silica supported aluminoxane, wherein the silica supported aluminoxane comprises silica gel particles having:
   a. an average surface area of from about 400 to 800 m²/g;
   b. an average pore diameter of from about 60 to 80 Angstrom; and
   c. at least 20% of the incremental pore volume comprised of pores having a pore diameter smaller than about 70 Angstrom;
   wherein the aluminoxane loading on the support is greater than 12 to 20 mmol Al/g silica; and
   the silica supported aluminoxane is prepared by a method comprising contacting:
   a. a silica support; and
   b. an aluminoxane;
   wherein when, during contacting (a) and (b), the temperature is 40° C. or greater.

27. The catalyst system of claim 1, wherein the catalyst component is represented by the formula:

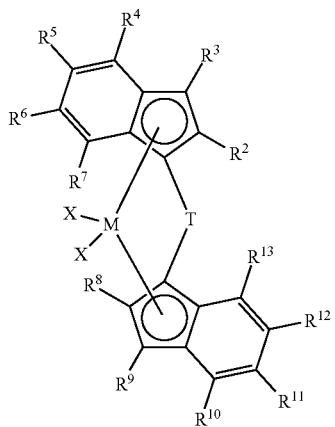

where M is a group 4, 5, or 6 metal; T is a bridging group; each X is, independently, an anionic leaving group; each $R^2$, $R^3$, $R^4$, $R^5$, $R^6$, $R^7$, $R^8$, $R^9$, $R^{10}$, $R_{11}$, $R_{12}$, and $R_{13}$ is, independently, halogen atom, hydrogen, hydrocarbyl, substituted hydrocarbyl, halocarbyl, substituted halocarbyl, silylcarbyl, substituted silylcarbyl, germylcarbyl, substituted germylcarbyl substituent or a —NR'$_2$, —SR', —OR', —OSiR'$_3$ or —PR'$_2$ radical, wherein R' is one of a halogen atom, a $C_1$-$C_{10}$ alkyl group, or a $C_6$-$C_{10}$ aryl group.

28. The catalyst system of claim 1, wherein two or more different catalyst compounds are present in the catalyst system.

29. The catalyst system of claim 1, wherein the catalyst component is one or more of: dimethylsilylene-bis(2-cyclopropyl-4-phenylindenyl)zirconiumX$_2$;
   dimethylsilylene-bis(2-cyclopropyl-4-phenylindenyl)hafnium X$_2$;
   dimethylsilylene-bis(2-methyl-4-phenylindenyl)zirconium X$_2$;
   dimethylsilylene-bis(2-methyl-4-phenylindenyl)hafniumX$_2$;
   dimethylsilylene-bis(2-methyl-4-orthobiphenylindenyl) hafniumX$_2$;
   dimethylsilylene-bis(2-methyl-4-orthobiphenylindenyl) zirconiumX$_2$;
   dimethylsilylene-(2-cyclopropyl-4-orthobiphenylindenyl)(2-methyl-4-3',5'-di-t-butylphenylindenyl)hafniumX$_2$;
   dimethyl silylene-(2-cyclopropyl-4-orthobiphenylindenyl)(2-methyl-4-3',5'-di-t-butylphenylindenyl)zirconiumX$_2$;
   dimethylsilylene-(2-isopropyl-4(4-t-butyl)phenyl)indenyl)(2-methyl-4-phenyl indenyl) zirconiumX$_2$;
   dimethylsilylene-(2-isopropyl-4(4-t-butyl)phenyl)indenyl)(2-methyl-4-phenyl indenyl) hafniumX$_2$;
   dimethylsilylene-(2-isopropyl-4(4-t-butyl)phenyl)indenyl)(2-methyl, 4-t-butylindenyl) zirconiumX$_2$;
   dimethylsilylene-(2-isopropyl-4(4-t-butyl)phenyl)indenyl)(2-methyl, 4-t-butylindenyl) hafniumX$_2$;
   dimethylsilylene-(2-isopropyl-4(4-t-butyl)phenyl)indenyl)(2-methyl-4-phenylindacenyl) zirconiumX$_2$;
   dimethylsilylene-(2-isopropyl-4(4-t-butyl)phenyl)indenyl)(2-methyl-4-phenylindacenyl) hafniumX$_2$;
   dimethylsilylene(4-o-Biphenyl-2-(1-methylcyclohexyl) methyl-indenyl)(4-(3,5-di-tert-butylphenyl) -2-methyl-indenyl) zirconiumX$_2$; and
   dimethylsilylene(4-o-Biphenyl-2-(1-methylcyclohexyl) methyl-indenyl)(4-(3,5-di-tert-butylphenyl) -2-methyl-indenyl)hafniumX$_2$;
   where X$_2$ is dichloride, dialkyl, dialkaryl, diflouride, diiodide, or dibromide, or a combination thereof.

30. The catalyst system of claim 1, wherein the catalyst component is represented by one of the following formulae:

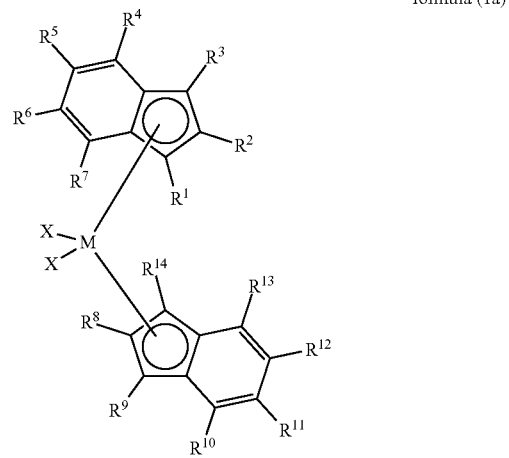

formula (1a)

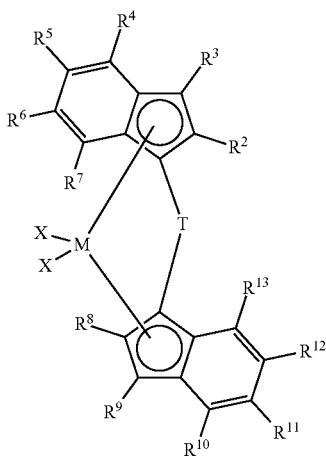

formula (1b)

where M is Hf or Zr,

T is a bridging group, each X is a univalent anionic ligand, or two X's are joined and bound to the metal atom to form a metallocycle ring, or two X's are joined to form a chelating ligand, a diene ligand, or an alkylidene ligand, and each $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$ is independently, hydrogen, a substituted hydrocarbyl group, an unsubstituted hydrocarbyl group, or a halide, provided that in formula 1a and 1b, at least one of $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$ is a cyclopropyl substituent; and provided that any adjacent $R^1$ to $R^{14}$ groups that are not a cyclopropyl substituent, optionally form a fused ring or multicenter fused ring system where the rings may be aromatic, partially saturated, or saturated.

31. The catalyst system of claim 1, wherein the catalyst component is represented by one of the following formulae:

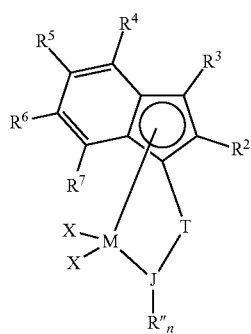

formula (2a)

formula (2b)

wherein

M is Hf or Zr,

T is a bridging group, each X is a univalent anionic ligand, or two X's are joined and bound to the metal atom to form a metallocycle ring, or two X's are joined to form a chelating ligand, a diene ligand, or an alkylidene ligand, J is a heteroatom with a coordination number of three from group 15 or with a coordination number of two from group 16 of the Periodic Table of Elements;

R" is a $C_1$-$C_{100}$ substituted or unsubstituted hydrocarbyl radical;

n is x-1-y where x is the coordination number of the heteroatom J where "x-1-y" indicates the number of R" substituents bonded to J and y is 0 or 1, and each $R^1$, $R^2$, $R^3$, $R^4$, $R^5$, $R^6$, or $R^7$, is, independently, hydrogen, a substituted hydrocarbyl group, an unsubstituted hydrocarbyl group, or a halide, provided that in formula 2a and 2b at least one of $R^1$, $R^2$, $R^3$, $R^4$, $R^5$, $R^6$, or $R^7$, is a cyclopropyl substituent; and provided that any adjacent $R^1$ to $R^7$ groups that are not a cyclopropyl substituent, optionally form a fused ring or multicenter fused ring system where the rings may be aromatic, partially saturated, or saturated.

32. A method of polymerizing olefins comprising contacting monomer and, optionally, comonomer with the catalyst system of claim 1, where in the monomer and comonomers are selected from substituted or unsubstituted $C_2$ to $C_{40}$ alpha olefins.

33. The method of claim 32 wherein the monomer and optional comonomer are selected from ethylene, propylene, butene, pentene, hexene, heptene, octene, nonene, decene, undecene, dodecene, and isomers thereof.

34. The method of claim 32 wherein the polymerization is carried out in the gas phase or slurry phase.

35. The catalyst system of claim 1, wherein the catalyst component is rac-dimethylsilyl (4-o-biphenyl-2-n-hexyl-indenyl) (2-methyl-4-(3',5'-di-tert-butyl-4'-methoxy-phenyl) -indenyl) zirconium dichloride or rac-dimethylsilyl bis(2-cyclopropyl-4-(3',5'-di-tert-butylphenyl) -indenyl) zirconium dichloride.

* * * * *